US008321278B2

(12) United States Patent
Haveliwala et al.

(10) Patent No.: US 8,321,278 B2
(45) Date of Patent: Nov. 27, 2012

(54) TARGETED ADVERTISEMENTS BASED ON USER PROFILES AND PAGE PROFILE

(75) Inventors: Taher H. Haveliwala, Mountain View, CA (US); Glen M. Jeh, San Francisco, CA (US); Sepandar D. Kamvar, San Francisco, CA (US)

(73) Assignee: Google Inc., Mountain View, CA (US)

( * ) Notice: Subject to any disclaimer, the term of this patent is extended or adjusted under 35 U.S.C. 154(b) by 1681 days.

(21) Appl. No.: 10/877,776

(22) Filed: Jun. 24, 2004

(65) Prior Publication Data

US 2010/0293057 A1 Nov. 18, 2010

(51) Int. Cl.
*G06Q 30/00* (2006.01)

(52) U.S. Cl. .................................................. 705/14.66

(58) Field of Classification Search .................... 705/14, 705/26

See application file for complete search history.

(56) References Cited

U.S. PATENT DOCUMENTS

| | | | | |
|---|---|---|---|---|
| 4,689,743 | A | 8/1987 | Chiu | |
| 5,204,768 | A | 4/1993 | Tsakiris et al. | |
| 5,510,828 | A | 4/1996 | Lutterbach et al. | |
| 5,724,521 | A * | 3/1998 | Dedrick | 705/26 |
| 5,724,567 | A | 3/1998 | Rose et al. | |
| 5,754,938 | A | 5/1998 | Herz et al. | |
| 5,754,939 | A | 5/1998 | Herz et al. | |
| 5,809,242 | A | 9/1998 | Shaw et al. | |
| 5,819,291 | A | 10/1998 | Haimowitz et al. | |
| 5,887,133 | A | 3/1999 | Brown et al. | |
| 5,948,061 | A | 9/1999 | Merriman et al. | |
| 5,974,412 | A | 10/1999 | Hazlehurst et al. | |
| 6,012,053 | A | 1/2000 | Pant et al. | |
| 6,112,202 | A | 8/2000 | Kleinberg | |
| 6,134,532 | A | 10/2000 | Lazarus et al. | |

(Continued)

FOREIGN PATENT DOCUMENTS

EP 0 926 614 A3 6/1999

(Continued)

OTHER PUBLICATIONS

Haveliwala, T. H., "Topic-Sensitive PageRank: A Context-Sensitive Ranking Algorithm for Web Search," IEEE Transactions on Knowledge and Data Engineering, 2003.

(Continued)

*Primary Examiner* — John Weiss
*Assistant Examiner* — Darnell Pouncil
(74) *Attorney, Agent, or Firm* — Fish & Richardson P.C.

(57) ABSTRACT

Targeted advertisements are provided to an advertisement consumer based on a user profile, a page profile, or a combination thereof. In embodiment where a user of a search engine is an advertisement consumer, the user utilizes a search engine to obtain search results relevant to a search query. A user profile of the user's interests is used to select advertisements for inclusion with search results. The user profile is evaluated by an advertisement server which determines which advertiser(s) offers a highest price for the user profile. Advertisements from these advertisers are then selected. In another embodiment, where the user is accessing a page on a third party website, the page may include a request for advertisements. A page profile is evaluated by an advertisement server that determines which advertiser(s) offers a highest price for the page profile. Advertisements from these advertisers are then selected, and provided to the user, where they are included in the retrieved page.

22 Claims, 9 Drawing Sheets

U.S. PATENT DOCUMENTS

| | | | | |
|---|---|---|---|---|
| 6,137,911 | A | 10/2000 | Zhilyaev | |
| 6,138,113 | A | 10/2000 | Dean et al. | |
| 6,285,987 | B1 * | 9/2001 | Roth et al. | 705/27 |
| 6,285,999 | B1 | 9/2001 | Page | |
| 6,289,342 | B1 | 9/2001 | Lawrence et al. | |
| 6,308,202 | B1 | 10/2001 | Cohn et al. | |
| 6,327,574 | B1 | 12/2001 | Kramer et al. | |
| 6,327,590 | B1 | 12/2001 | Chidlovskii et al. | |
| 6,356,898 | B2 | 3/2002 | Cohen et al. | |
| 6,360,221 | B1 | 3/2002 | Gough et al. | |
| 6,366,298 | B1 | 4/2002 | Haitsuka et al. | |
| 6,370,527 | B1 | 4/2002 | Singhal | |
| 6,385,592 | B1 | 5/2002 | Angles et al. | |
| 6,385,619 | B1 | 5/2002 | Eichstaedt et al. | |
| 6,449,657 | B2 | 9/2002 | Stanbach, Jr. et al. | |
| 6,560,600 | B1 | 5/2003 | Broder | |
| 6,584,468 | B1 | 6/2003 | Gabriel et al. | |
| 6,601,061 | B1 | 7/2003 | Holt et al. | |
| 6,665,656 | B1 | 12/2003 | Carter | |
| 6,665,837 | B1 | 12/2003 | Dean et al. | |
| 6,665,838 | B1 | 12/2003 | Brown et al. | |
| 6,681,223 | B1 | 1/2004 | Sundaresan | |
| 6,684,205 | B1 | 1/2004 | Modha et al. | |
| 6,772,200 | B1 | 8/2004 | Bakshi et al. | |
| 6,799,176 | B1 | 9/2004 | Page | |
| 6,871,202 | B2 | 3/2005 | Broder | |
| 6,912,505 | B2 | 6/2005 | Linden et al. | |
| 6,922,685 | B2 | 7/2005 | Greene et al. | |
| 6,990,525 | B1 * | 1/2006 | Ying et al. | 709/227 |
| 7,062,510 | B1 * | 6/2006 | Eldering | 1/1 |
| 2002/0024532 | A1 | 2/2002 | Fables et al. | |
| 2002/0065802 | A1 | 5/2002 | Uchiyama | |
| 2002/0099685 | A1 | 7/2002 | Takano et al. | |
| 2002/0120619 | A1 | 8/2002 | Marso et al. | |
| 2002/0123912 | A1 | 9/2002 | Subramanian et al. | |
| 2002/0194589 | A1 * | 12/2002 | Cristofalo et al. | 725/32 |
| 2002/0198882 | A1 | 12/2002 | Linden et al. | |
| 2003/0037041 | A1 | 2/2003 | Hertz | |
| 2003/0088562 | A1 | 5/2003 | Dillon et al. | |
| 2003/0204502 | A1 | 10/2003 | Tomlin et al. | |
| 2003/0208478 | A1 | 11/2003 | Harvey | |
| 2003/0208482 | A1 | 11/2003 | Kim | |
| 2003/0233345 | A1 | 12/2003 | Perisic et al. | |
| 2004/0024752 | A1 | 2/2004 | Manber et al. | |
| 2004/0044571 | A1 | 3/2004 | Bronnimann | |
| 2004/0059708 | A1 | 3/2004 | Dean et al. | |
| 2004/0073485 | A1 | 4/2004 | Liu et al. | |
| 2004/0249709 | A1 | 12/2004 | Donovan et al. | |

FOREIGN PATENT DOCUMENTS

| | | | |
|---|---|---|---|
| EP | 1050830 | A2 | 11/2000 |
| WO | WO 99 22328 | A | 5/1999 |
| WO | WO 00 02389 | A | 1/2000 |
| WO | WO 01/44992 | A1 | 6/2001 |
| WO | WO 01/63472 | A2 | 8/2001 |
| WO | WO 03/107127 | A2 | 12/2003 |
| WO | WO 2005/033979 | | 4/2005 |

OTHER PUBLICATIONS

Haveliwala, T. H. et al., "An Analytical Comparison of Approaches to Personalizing PageRank," Stanford University Technical Report, 2003-35, Jun. 20, 2003.

Marais, J., Bhara. K. "Supporting cooperative and personal surfing with a desktop assistant." Proceedings of ACM UIST'97, Oct. 1997.

Jeh, G., Widom, J.. "Scaling personalized web search", In Proceedings of the 12th international Conference on World Wide Web (Budapest, Hungary, May 20-24, 2003). WWW '03. ACM Press, New York, NY, pp. 271-279.

Aggarwal, C. et al., "A Framework for the Optimizing of the WWW Advertising," International IFIP Working Conference on Electronic Commerce, 1998, Hamburg, Germany, published in Trends in Distributed Systems for Electronic Commerce, edited by W. Lamersdorf and M. Merz, Springer Verlag Lecture Notes in Computer Science, 1998, pp. 1-10, vol. 1402.

Barroso, L.A. et al., "Web Search for a Planet: The Google Cluster Architecture," IEEE Micro, Mar.-Apr. 2003, pp. 22-28.

Bohté, Sander M. et al., "On Current Technology for Information Filtering and User Profiling in Agent-Based Systems, Part I: A Perspective", CWI, Centre for Mathematics and Computer Science, Jan. 2000, pp. 1-12.

Brin, S. et al., "The Anatomy of a Large-Scale Hypertextual Web Search Engine," Computer Networks and ISDN Systems, Apr. 1998, pp. 107-117, vol. 30, No. 1-7.

Carr, D.A., "Using Interaction Object Graphs to Specify Graphical Widgets," Dept. of Computer science, Univ. of Maryland, Sep. 1994.

Dumais, Susan et al., "Stuff I've Seen: A System for Personal Information Retrieval and Re-Use", SIGIR'03, Jul. 28-Aug. 1, 2003, pp. 1-8.

Geiger, D. et al., "Asymptotic Model Selection for Directed Networks with Hidden Variables," May 1996, Technical Report MSR-TR-96-07, Microsoft Research, Advanced Technology Division.

International Search Report re International Application No. PCT/US2004/026631, International Filing Date Aug. 13, 2004.

International Search Report for International Application No. PCT/US2005/025081, mailed Dec. 2, 2005.

Jordan, M. et al., "Hidden Markov Decision Trees," Center for Biological and Computational Learning Massachusetts Institute of Technology and Department of Computer Science, University of Toronto, Canada.

Kohda, Y. et al., "Ubiquitous Advertising on the WWW: Merging Advertisement on the Browser," Fifth Intenrational World Wide Conference, May 6-10, 1996, pp. 1-9, Paris, France.

Langheinrich, M. et al., "Unintrusive Customization Techniques for Web Advertising," Computer Networks, 1999, pp. 1259-1272, vol. 31, No. 11-16.

Lawley, Elizabeth Lane, "Mamamusings", "MSR Presentations to Search Champs", http://mamamusings.net/archives/2004/10/05/msr_presentations_to_search champs, Oct. 5, 2004, p. 1 of 1.

Liao, H.S. et al., "Browsing Unix Directories with Dynamic Queries: An Evaluation of Three Information Display Techniques," Technical Report CAR-TR-605 CS-TR-2841, Dept. of Computer Science, Univ. of Maryland, Feb. 1992.

Matthews, J., "Automating Ad Intelligence," Silicon Valley, Jul. 24, 2000, [online] Retrieved from the Internet<URL:http://siliconvalley.internet.com/news/article.php/3531 420651>.

Meila, M. et al., "Estimating Dependency Structure as a Hidden Variable," Massachusetts Institute of Technology, A.I. Memo No. 1648, C.B.C.L. Memo No. 165, Sep. 1998.

Meng, W. et al., "Building Efficient and Effective Metasearch Engines," ACM Computing Surveys, Mar. 2002, pp. 48-49, vol. 34, No. 1.

Pretschner, A. et al., "Ontology Based Personalized Search," Proc. $11^{th}$ IEEE Int. Conf. on Tools with Artificial Intelligence, Nov. 1999, pp. 391-398, Chicago.

Weinburger, D., "Microsoft Research", Joho the Blog, www.hyperorg.com, Oct. 2, 2003, pp. 1-3.

Lawley, Elizabeth Lane, "Mamamusings", "MSR Presentations to Search Chanmps", http://mamamusings.net/archives/2004/10/05/msr_presentations_to_searchchamps, Oct. 5, 2004, p. 1 of 1.

Bohte, Sander M. et al., "On Current Technology for Information Filtering and User Profiling in Agent-Based Systems, Part I: a Perspective", CWI, Centre for Mathematics and Computer Science, Jan. 2000, pp. 1-12.

Dumais, Susan et al., "Stuff I've Seen: A System for Personal Information Retrieal and Re-Use", SIGIR '03, Jul. 28-Aug. 1, 2003, pp. 1-8.

Weinburger, D., Microsoft Research, Joho the Blog, www.hyperorg.com , Oct. 2, 2003, pp. 1-3.

Haveliwala, T.H., "Topic-Sensitive PageRank: A Context-Sensitive Ranking Algorithm for Web Search," IEEE Transactions on Knowledge and Data Engineering, 2003.

Haveliwala, T.H., et al. "An Analytical Comparison of approaches to Personalizing PageRank," Stanford University Technical Report, 2003-35, Jun. 20, 2003.

Marais, J., Bhara. K. "Supporting cooperative and personal surfing with a desktop assistant." Proceedings of ACM UIST97, Oct. 1997.

Jeh, G., Widom, J. "Scaling personalized web search", In Proceedings of the 12$^{th}$ International Conference on World Wide Web (Budapest, Hungary, May 20-24, 2003). WWW'03. ACM Press, New York, NY, pp. 271-279.
Aggarwal, C. et al., "A Framework for the Optimitzing of the WWW Advertising." International IFIP Working Conference on Electronic Commerce, 1998, Hamburg, Germany, published in Trends in Distributed Systems for Electronic Commerce, edited by W. Lamersdorf and M Merz, Springer Verfag Lecture Notes in Computer Science, 1998, pp. 1-10 vol. 1402.
Barroso, L.A. et al., Web Search for a Planet: The Google Cluster Architecture,: IEEE Micro, Mar.-Apr. 2003, pp. 22-28.
Brin, S. et al. "The Anatomy of a Large-Scale Hypertextual Web Search Engine," Computer Networks and ISDN Systems, Apr. 1998, pp. 107-117, vol. 30, No. 1-7.
Carr, D.A. "Using Interaction Object Graphs to Specify Graphical Widgets," Dept. Of Computer science, Univ. of Maryland, Sep. 1994.
Cho, J. et al., "Efficient Crawling Through URL Ordering," Computer Networks and ISDN Systems, Apr. 1998, pp. 161-171, vol. 30, No. 1-7.
Geiger, D. et al. "Asymptotic Model Selection for Directed Networks with Hidden Variables," May 1996, Technical Report MSR-TR-96-07, Microsoft Research, Advanced Technology Division.
Heckerman, D. et al., "Learning Bayesian Networks: The Combination of Knowledge and Statistical Data," Microsoft Research, Advanced Technology Division, Mar. 1994, pp. 1-53.
Jordan, M. et al. "Hidden Markov Decision Trees," Center for Biological and Computational Learning, Massachusetts Institute of Technology and Department of Computer Science, University of Toronto. Canada.
Kohda, Y. et al., "Ubiquitous Advertising on the WWW: Merging Advertisement on the Browser," fifth International World Wide Conference, May 6-10.
Langheinrich, M. et al., Unintrusive Customization Techniques for Web Advertising, Computer Networks, 1999, pp. 1259-1272, vol. 31, No. 11-16.
Liao, H.S. et al., "Browsing Unix Directiories with Dynamic Queries: An Evaluation of Three Information Display Techniques," Technical Report CAR-TR-605 CS-TR-2841, Dept. of Computer Science, Univ. of Maryland, Feb. 1992.
Marais, J. et al., "Supporting coorperative and personal surfing with a desktop assistant," Proceedings of ACM UIST'97, Oct. 1997.
Matthews, J., "automating Ad Intelligence," Silicon Valley, Jul. 24, 2000 [online] Retrieved from the Internet,URL: http://siliconvalley.internet.com/news/article.php/3531_420651>.
Meila, M. et al. "Estimating Dependency Structure as a Hidden Variable," Massachusetts Institute of Technology, A.I. Memo No. 1648, C.B.C.L. Memo No. 165, Sep. 1998.
Meng, W. et al. "Building Efficient and Effective Metasearch Engines," ACM Computing surveys, Mar. 2002, pp. 48-49, vol. 34. No. 1.
Osada, M. et al., "AlphaSlider: Searching Textual Lists with sliders," Dept. of Computer Science, Univ. Of Maryland, Apr. 1993.
Pretschner. A. et al., "Ontology Based Personalized Search," Proc. 11$^{th}$ IEEE Int. Conf. on Tools with Artifical Intelligence, Nov. 1999, pp. 391-398, Chicago.
Rosenstein, M. et al., "Recommending from Content: Preliminary Results from an E-Commerce Experiment," CHI 2000, published Apr. 16, 2000, The Hague, The Netherlands.

* cited by examiner

Term-based Profile Table 300

Link-based Profile Table 500

Context Analysis

| Context Pattern | Weight |
|---|---|
| (1,0,"buy") | 0.4 |
| (0,1,"builds") | 0.5 |
| (1,1,"buy * here") | 0.56 |
| (2,0,"welcome to") | 0.7 |
| (2,0,"world's best") | 0.8 |
| . . . | . . . |

| Important Term | Weight |
|---|---|
| Foobar | 1.2 |
| cars | 0.8 |

TARGETED ADVERTISEMENTS BASED ON USER PROFILES AND PAGE PROFILE

CROSS REFERENCE TO RELATED APPLICATIONS

This application is related to of U.S. application Ser. No. 10/676,711, entitled "PERSONALIZATION OF WEB SEARCH"; this application is also related to U.S. application Ser. No. 10/314,427, entitled "METHOD AND APPARATUS FOR SERVING RELEVANT ADVERTISEMENTS" (herein, "Relevant Advertisements Application"), and to U.S. application Ser. No. 10/676,571, entitled "METHOD AND APPARATUS FOR CHARACTERIZING DOCUMENTS BASED ON CLUSTERS OF RELATED WORDS," (herein, "Clusters of Related Words Application"), and to U.S. application Ser. No. 10/646,331, entitled "IMPROVED METHODS FOR RANKING NODES IN LARGE DIRECTED GRAPHS," (herein "Ranking Nodes Application"). All of the above-identified applications are commonly owned with the instant application, and are incorporated by reference herein.

FIELD OF INVENTION

This invention relates in general to providing advertisements to users of web sites and search engines.

BACKGROUND OF INVENTION

The current state of the art in online search engines is highly advanced in its ability to retrieve documents that are responsive to the terms of a query. The infeasibility of charging users for each search has lead search engine providers to rely on revenue from advertisers in order to fund the search services. Advertisements have historically been placed on various parts of the search engine interface, including as banner ads, and paid inclusion links, and sidebar ads. These advertisements are typically selected in response to the particular terms of the user's query. The underlying assumption of this model is that the query terms reflect the user's interests, and thus selecting advertisements based on the query terms should yield advertisements for products or services the match these interests. Of course, advertisers generally desire to provide ads to those users who would be interested in their products or services. Thus, if the user's query is "MP3 players", then the assumption is that the user is interested in learning about, and potentially purchasing an MP3 player, and hence an advertisement for a particular MP3 player may result in the user's purchase. The current state of the art for such advertisements is the use of pay-for-performance advertisements, in which the advertiser pays the search engine provider for placement of the advertisement on the search results page only if the user selects (clicks on or activates) the advertisement.

The problem with query driven advertisements is in the underlying assumption that the current query best expresses the user's interests. This assumption is made because the query is the only information that the search engine has about the user, and thus the only basis on which to determine the user's interests. However, a query is only a very transient and unreliable indicator of a user's underlying interests. A user may search for all manner of information, and much of the time this may be for business, technical, scientific or other information entirely unrelated to the user's actual personal interests, which the advertiser is typically trying to reach.

Thus, there is a need for a mechanism by which search engine providers can target advertisements on their search engines the personal interests of a user.

SUMMARY OF THE INVENTION

An advertisement serving system and methodology provides advertisements that are targeted to the user in conjunction with various types of advertisement requests, such as search queries or page views. In one embodiment, users have user profiles that express their interests. A user's interests may be expressed as terms, categories, or links, or any combination thereof. The user profile information is derived from any of prior searches by the user, prior search results, user activities in interacting with prior search results, user demographic, geographic, or psychographic information, expressed topic or category preferences, and web-sites associated with the user. Advertisers provide a price that they will pay to display advertisements to different user profiles, in essence bidding for different user profiles. An advertisement request, for example in conjunction with a search query, is received from a user (or a client device such as the user's browser). The user profile of the user is obtained, and the advertiser (or advertisers) who have offered the highest effective price for the user profile are selected for providing advertisements to the user. Advertisements from these advertisers are selected, and provided to the user for display in conjunction with the search results.

In another embodiment, a user's browser makes a request for an advertisement in response to accessing a page on the website of a site operator who desires to display advertisements to users of the website. The request includes identification of the page, such as URL, from which a profile of the page is obtained. The page profile describes topics or interests of the site operator, such as what topics, terms, domains, or the like would be relevant to users of the website. Advertisers also provide a price that they will pay to display advertisements on pages having particular page profiles, in essence bidding for different page profiles. The advertiser (or advertisers) who have offered the highest effective price for the page profile are selected for providing advertisements, and advertisements from these advertisers are selected, and provided to the user for display in conjunction with the page.

The figures depict various embodiments of the present invention for purposes of illustration only. One skilled in the art will readily recognize from the following discussion that alternative embodiments of the illustrated and described structures, methods, and functions may be employed without departing from the principles of the invention.

DETAILED DESCRIPTION

System Overview

Figure 1A:
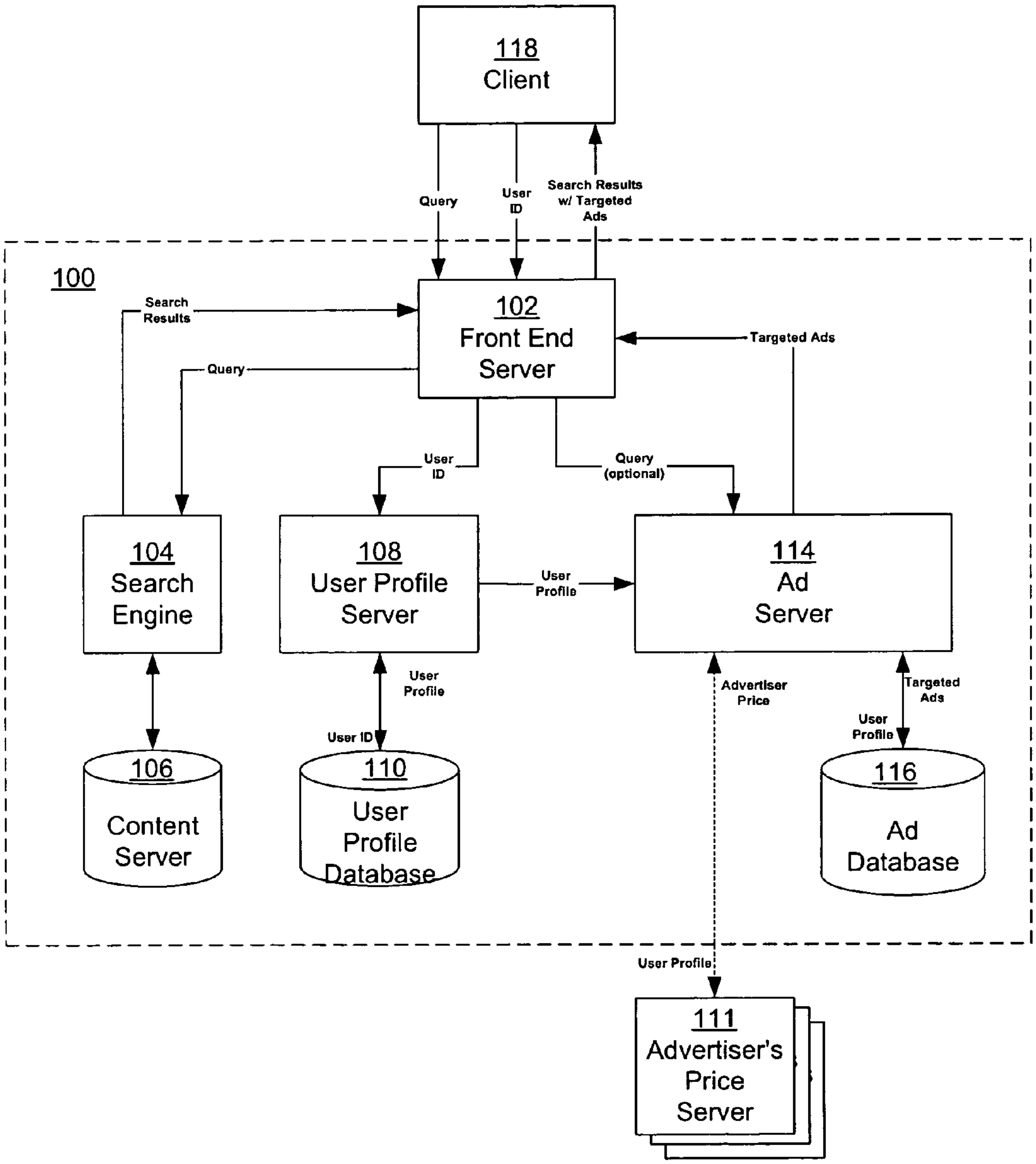
FIG. 1*a* is a block diagram of system for providing targeted advertisements in accordance with one embodiment of the invention.

FIG. 1*a* illustrates a system 100 in accordance with one embodiment of the present invention. System 100 comprises a front-end server 102, a search engine 104 and associated content server 106, a user profile server 108 and associated user profile database 110, an advertisement server 114 and associated advertisement database 116. During operation, a user accesses the system 100 via a conventional client 118 over a network (such as the Internet, not shown) operating on any type of client computing device, for example, executing a browser application or other application adapted to communicate over Internet related protocols (e.g., TCP/IP and HTTP). The client 118 is an example of an ad consumer, which is an entity which makes requests to the front end server 102 for advertisements. While only a single client 118 is shown, the system 100 supports large number of concurrent sessions with many clients. The system 100 operates on high performance server class computers; similarly the client device 118 can be any type of computing device. The details of the hardware aspects of server and client computers is well known to those of skill in the art and thus is not further described here.

The front-end server 102 is responsible for receiving an ad request submitted by the client 118 along with some form of user ID that identifies either the user herself or the client device 118. In the example of FIG. 1*a*, the ad request is a search query. The front-end server 102 provides the query to the search engine 104, which evaluates the query to retrieve a set of search results in accordance with the search query and returning the results to the front-end server 102.

The search engine 104 communicates with one or more of the content servers 106 to select a plurality of documents that are relevant to user's search query. A content server 106 stores a large number of indexed documents indexed (and/or retrieved) from different websites. Alternately, or in addition, the content server 106 stores an index of documents stored on various websites. "Documents" are understood here to be any form of indexable content, including textual documents in any text or graphics format, images, video, audio, multimedia, presentations, and so forth. In one embodiment, each indexed document is assigned a rank or score using a link-based scoring function that takes into account an attribute associated with one or more links to the document. One example of a link-based scoring function is the page rank of a document. An exemplary form of page rank is described in U.S. Pat. No. 6,285,999, which is incorporated by reference. The search engine 104 assigns a score to each document based on the document's page rank, the text associated with the document, and the search query.

The user profile server 108 is responsible for providing a user profile in response to a received user ID from the front end server 102. The user profile server 108 also may maintain performance statistics for each user profile describing how the user profile responds, either generally or specifically, to advertisements. The user profiles and performance information is stored by the user profile server in the user profile database 110. Each user profile includes information that identifies a user as well as describes the user's interests. In this embodiment, the user's interests are employed to target advertisements to the user to accompany the search results. A user profile can be derived from a variety of different sources, such as the user's previous search experience, personal information, web pages associated with the user, and so forth. One embodiment for constructing the user's profile is further described in the next section.

The advertisement server 114 is responsible for providing a set of targeted advertisements to the front end server 102 for inclusion with the search results. The advertisement server 114 selects the targeted advertisements in response to the user profile (received from the user profile server 108), the query (optionally, received from the front end server 102). The advertisements are stored, along with information related to the advertisers, and their offering prices for different user profiles, in the advertisement database 116. More specifically, the advertisement server 114 uses the user profile and optionally the query, to determine which advertisements to provide for combination with the search results. Generally, the advertisement server 114 determines for the user profile of the current user the advertisers who have offered the highest effective prices for a user having a profile matching some or all of user profile, and then selects corresponding advertisements of these advertisers as the targeted advertisements.

The targeted advertisements selected by the advertisement server 114 are provided to the front end server 102. The front end server 102 combines the search results with the targeted advertisements and returns this information to the client 118, which renders then for display to the user.

System Operation

An exemplary operation of system 100 is now described in further detail. A user accesses the system 100 from the client 118 by connecting with the front end server 102. The client 118 will provide the front end server 102 with a cookie or other token which communicates a user ID of the user. Alternatively, the user can login to the front end server 102 using standard login procedures (e.g., username and password). In either event, the front end server 102 is able to obtain a user ID. The user also enters a search query (which can be understood as a type of ad request) which is submitted to the front end server 102.

The front end server 102 passes the search query to the search engine 104, which retrieves a list of relevant document as search results from the content server(s) 106. The particular implementation of the search engine 104's search algorithms is not an essential feature of the present invention, and any useful search engine may be used; an exemplary search engine is described in U.S. Pat. No. 6,285,999, which is incorporated by reference. The search engine 104 returns a set of search results to the front end server 102, typically including a document name, a URL to the source of the document, an extract of relevant text from the document, and other information as desired. The search engine 104 may also order the search results, for example based on relevancy to the query.

The front end server 102 also passes the user ID to the user profile server 108. The user profile server 108 retrieves the associated user profile from the user profile database 110. The user profile server 108 may also dynamically generate a portion of the user profile based on information available from the client 118, such as the domain from which the client 118 is accessing the system, the current query, session or other state information. The user profile server 108 provides the user profile to the ad server 114.

The advertisement server 114 receives the user profile and the query. The advertisement server 114 determines which advertisers have offered a price with respect to the user profile (or portion thereof), and then determines the one or more advertisers offering a highest effective price for the user profile.

This is done by evaluating the user profile against advertiser price information (or functions) provided by the advertisers. The advertiser price information may also take into account the search query itself in providing a price for the user profile.

The advertiser price information is stored in the advertisement information database 116. In general, for each advertiser, account information is maintained in the database 116. The account information will generally include a campaign defined by the advertiser, comprising a set of advertisements, and may include a start date, an end date, and one or more advertisements (i.e., "creatives") used to market a given good, service, class of goods, or class of services. In accordance with the present invention, the advertiser can define a campaign to include attributes or characteristics found in the user profiles, a price or price function associated with such attributes, and a set of advertisements to be selected from among for this profile. More specifically, the advertiser identifies one or more sets of user profile attributes that it is interested in, and a price that it is willing to pay for placement of an advertisement on a page requested by a user whose user profile matches (in whole or in part) the identified attributes. The advertiser may also specify attributes of the search query in setting its price. A given advertiser, for example, may offer $2.10 for a user profile including interests of {sports, baseball, football, basketball}, and also $1.35 for a user profile including the interests of {politics, international affairs, finance}. Likewise, an advertiser could refine the above price by offering $3.35 for the same user profile in combination with the search query "San Francisco Giants." An advertiser can define any number of user profile, search query, and price combinations. The price information can be stored in any useful manner, including as a list of prices, or a price function that is registered by the advertiser with the advertisement server 114, and then evaluated at runtime by the advertisement server 114.

Some advertisers may prefer to not disclose their pricing policies for each user profile. For such advertisers, the pricing information is instead represented by a URL or other addressing information to the advertiser's own price server 111, which is maintained by the advertiser separately from the system 100. For such an advertisers, the advertisement server 114 queries the advertiser's price server 111 by passing in the user profile and search query. The price server 111 can execute an internal price function to evaluate the user profile and search query and return an offer price. The price server 111 can weight either component as desired by the advertiser, thus giving the advertiser complete flexibility in deciding the relative importance of the user profile and search query, on a per request basis. The advertisement server 114 uses that price information along with price information from other advertisers as stored in the advertisement database 116. Note that the advertisement server 114 may obtain the price information in this manner for any number of advertisers. The external price servers 111 and internal evaluation of prices by the advertisement server 114 can be concurrently or independently.

The effective price of an advertiser's offer may be actual price stated by the advertiser, or it may be the stated price after adjustment for performance information associated with the user profile. The adjustment of the advertiser's offer price by performance parameters allows the system to maximize revenue received for each user profile and set of targeted advertisements. Generally, the user profile performance information statistically describe how a user profile "performs" in response to advertisements. The performance may be measured in terms of any type of interaction by which a user profile indicates some level of interest in an advertisement beyond merely an impression. Examples of a performance information include a click-through count for the user profile (number of times a user profile has clicked through to an ad), a user profile click-through rate (e.g., the rate at which the user profile clicks through to an ad), a conversion count (e.g., the number of times a transaction is consummated by a given user profile, either immediately or at some later time), a conversion rate, user profile ratings of the ad (e.g., ratings of a given advertisement by users with a given user profile), or other performance measures that relate a given user profile to the consumption of advertisements in general, or specific advertisements (or groups of advertisements). For rate related performance parameters, the parameters may be time-weighted, so that more recent data is more heavily weighted than older data (e.g., linearly weighted), and further, the time related data may be windowed as well. The performance parameters for user profiles is captured and updated by the user profile server 108 in the user profile database 110.

The user profile performance information may be user specific or aggregated. User specific information is the performance information for a particular individual user's profile. Aggregated user profile information is information for a defined user profile, aggregated (e.g., averaged) from all individual users who user profiles match the defined user profile. The difference is illustrated as follows. A particular user, say John Q. Searcher, will have a user profile describing his interests in, for example {sports, baseball, football}. Associated with Mr. Searcher's user profile may be specific performance information, including Mr. Searcher's click-through rate, click through count, and conversion rate and count for sports related advertisements, for baseball related advertisements, and for football related advertisements. These would be examples of user profile specific performance information.

Now, assume that there are several thousands users, each with their own user profiles which happen to include one or more of {sports, baseball, football} as interests. Seven different aggregated user profiles can be defined (from the combinations of these 3 interests) and for each user profile, aggregate performance information can be calculated. For example, an average click through rate for the user profile {sports, football} can be calculated from those profiles that include both of these interests. Thus, an advertiser (or the system operator) can specify how to adjust the advertisers' offer prices based on either specific or aggregate profiles.

The advertisement information can be entered and managed via ad information entry and management operations (not shown). These include campaign (e.g., targeting) assistance operations that help advertisers generate effective ad campaigns. The campaign assistance operations can use information provided by an inventory system that tracks advertisement impressions, ad impressions already reserved, and ad impressions available for given keywords. Further details of these operations are described in the Relevant Advertisements Application.

Once the advertisement server 114 has determines which advertiser or advertisers have offered the highest effective price for the user profile, the server 114 selects one or more advertisements associated with these advertisers. These targeted advertisements are returned to the front end server 102. The front end server 102 merges these advertisements with the search results, and provides the combined page to the client 118, for display to the user, typically in the window of a browser or similar application (depending on client device).

The front end server 102 determines how many of the targeted advertisements are to appear on each page of the search results, their order, and their placement. The targeted advertisements can be displayed next to the search result lists in a side panel (e.g., in an iframe), in a separate frame of the window, or in any other graphical format deemed appropriate.

The net result of this process is that each user will see a set of advertisements that are targeted specifically to his or her interests. Thus two different users, with different user profiles, may see two different (though not necessarily disjoint) sets of advertisements, even if they input the same search query.

Figure 1B:
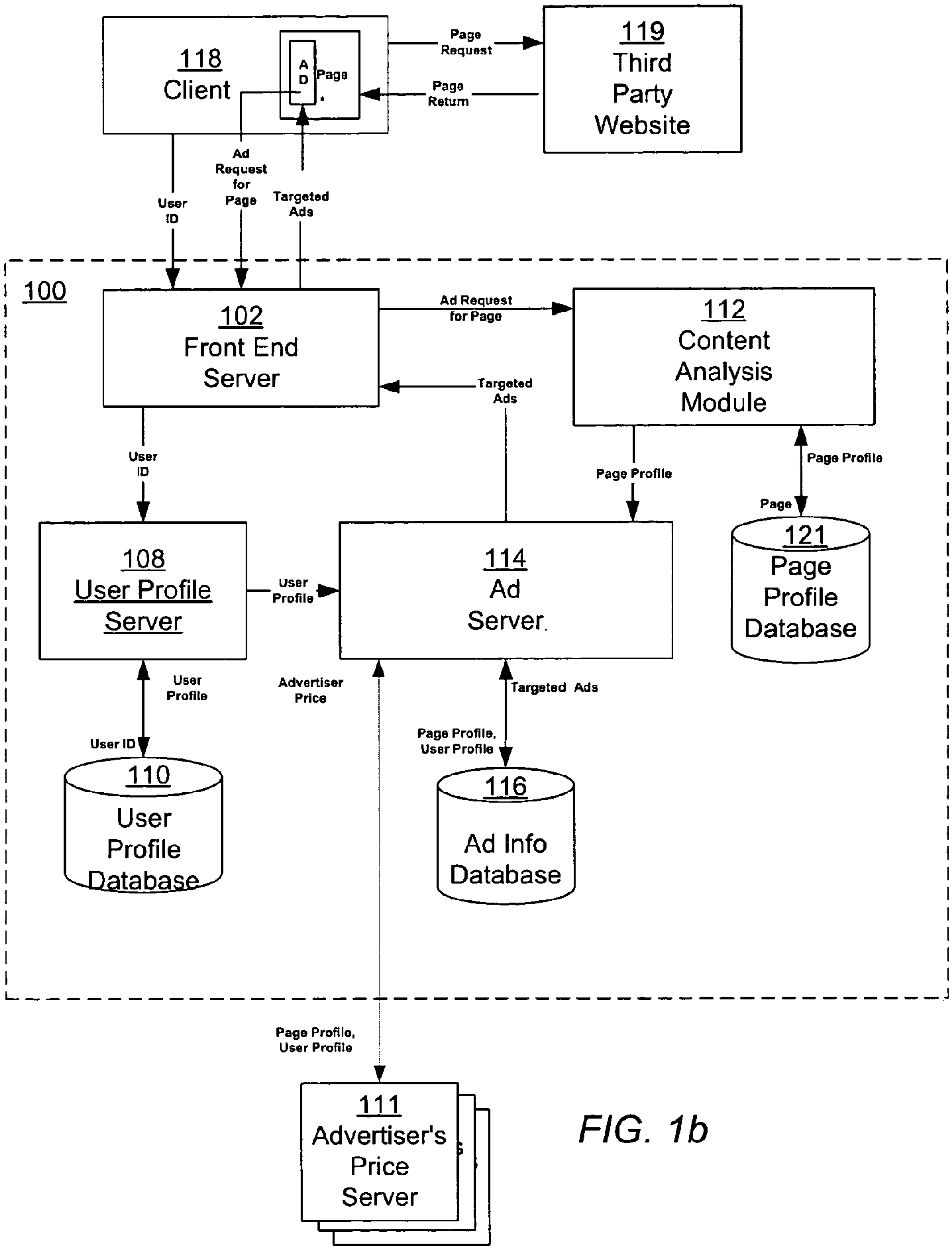
FIG. 1*b* is a block diagram of system for providing targeted advertisements in accordance with another embodiment of the invention.

FIG. 1*b* illustrates another embodiment of a system 100 that provides targeted advertisements in response to advertisement request. Many elements of this embodiment are shared with the embodiment of FIG. 1*a*, and various elements (e.g., search engine 104) that are not used in this embodiment are not shown in the figure.

The embodiment of FIG. 1*b* operates where the advertisement request is made by a client 118 when accessing a third party website 119, which has agreed to have system 100 to place advertisements on its pages. The client 118 first makes a page request of the third party website 119, for example, loading the home page of the site, which page is returned by the site 119. The page may have, for example, both content provided by the third party and an iframe object that makes a request for advertisements from the system 100. The page request will include information associated with the page of the third party website 119, for example, the URL of the page, or other metadata.

When the client 118 loads the page, the ad request is passed to the front end server 102. The client 118 also passes a user ID, as before, in the form of a cookie, or a previous login. As before, the front end server 102 passes the user ID to the user profile server 108, which obtains the user profile for the user from the user profile database 110, in the manner explained above.

The front end server 102 also passes the ad request to the content analysis module. The content analysis module 112 uses the page parameters, e.g., the URL of the page, to access a page profile in the page profile database 121. The page profile is a profile of the page that describes characteristics of the page or the third party website. Exemplary page information include:

a domain of the page;

a type of organization that hosts the website including the page;

key words extracted from the page;

URL of the page and any parameters included therein;

anchor text referring to the page;

inbound link structure of the page;

outbound link structure of the page.

The domain, type, keywords, and so forth may be automatically determined by the content analysis module 112 at the time the page is submitted by the creator to the system 100, or may be provided by the page creator as metadata that is stored in the database 121.

The content analysis module 112 may also generate the page profile at the time of the request, for example, if a page profile is not available in the page profile database 121.

The page profile from the content analysis module 112 and the user profile from the user profile server 108 are provided to the advertisement server 114. The advertisement server 114 determines which advertisers have offered a price with respect to the user profile (or portion thereof) and/or the page profile, and then determines the one or more advertisers offering a highest effective price for the user profile. As before, this is done by evaluating the user profile in combination with the page profile against advertiser price information (or functions) provided by the advertisers. The advertiser price information for each advertiser can be retrieved from the advertisement information database 116 or from any of the advertiser's price servers 111, as per the availability of the information on an advertiser-by-advertiser basis. The user profile information can be as described above, including any of the various levels or types of information.

In one embodiment, the advertisement server 114 uses both the user profile and the page profile to determine each advertiser's price, but any advertiser may individually discard or weight either of these components as it desires. For example, one advertiser may only consider the page profile of the current page when providing a price, while another advertiser may consider both the user profile and the page profile, but weight them separately (e.g., weighting the page profile at 70% and the user profile at 30% to determine a price).

Once the advertisement server 114 has determines which advertiser or advertisers have offered the highest effective price for the page profile user profile, the server 114 selects one or more advertisements associated with these advertisers. These targeted advertisements are returned to the front end server 102. The front end server 102 forwards the targeted advertisements to the client 118, which combines the advertisements into the page received from the third party website 119 for display to the user. The front end server 102 may determine how many of the targeted advertisements are to appear on the page, their order, and their placement. The targeted advertisements can be displayed next in side panel (e.g., in the iframe on the page) in a separate frame of the window, or in any other graphical format deemed appropriate.

The net result of this process is that each user will see a set of advertisements that are targeted specifically to the page of the third party website that is being viewed, and may be further targeted to the user's profile.

The next sections describe the construction and use of user profiles.

Creation and Maintenance of User Profiles

A user profile describes the user's interests in a manner that can be used to personalize the results of any particular search query. The user profile can be derived from information that is explicitly provide by the user (e.g., designation of interests or topics in a directory), or information that is inferred from the user's behaviors and interactions with the search engine 104, or information that is inferred from the user's online relationships (e.g., websites or pages associated with the user's IP address).

Figure 2:
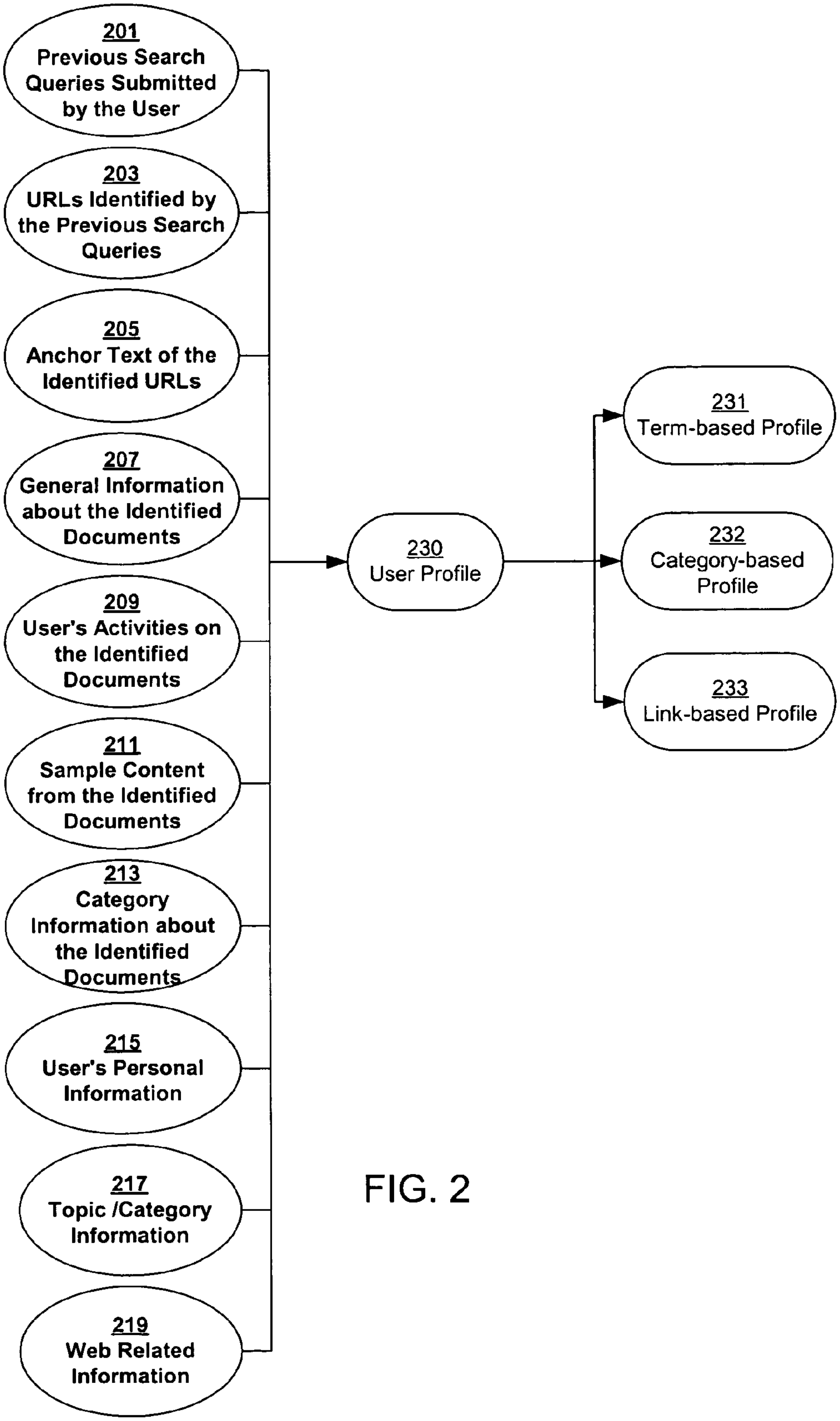
FIG. 2 illustrates multiple sources of user information and their relationship to a user profile.

With respect to information derived from the user's interaction with the search engine 104, prior search activities (both search queries themselves, and user access or non-access to the results) provide useful hints about the user's interests. FIG. 2 provides an overview of various sources of information that are beneficial for user profile construction. For example, previously submitted search queries 201 are very helpful in profiling a user's interests. If a user has submitted multiple search queries related to diabetes, it is more likely than not that this is a topic of interest to the user. If the user subsequently submits a query including the term "organic food", it can be reasonably inferred that he may be more interested in those organic foods that are helpful in fighting diabetes. Similarly, the universal resource locators (URL) 203 associated with the search results in response to the previous search queries and their corresponding anchor texts 205, especially for search result items that have been selected or "visited" by the user (e.g., downloaded or otherwise viewed by the user), are helpful in determining the user's preferences. When a first page contains a link to a second page, and the link has text associated with it (e.g., text neighboring the link), the text associated with the link is called "anchor text" with respect to the second page. Anchor text establishes a relationship between the text associated with a URL link in a document and another document to which the URL link points. The advantages of anchor text include that it often provides an accurate description of the document to which the URL link points, and it can be used to index documents that cannot be indexed by a text-based search engine, such as images or databases. In addition, a count may be maintained for each URL that is associated with the user's search results, and URLs receiving high counts are identified or otherwise analyzed in the user profile.

After receiving search results, the user may click on some of the URL link, thereby downloading the documents referenced by those links, so as to learn more details about those documents. Certain types of general information 207 can be associated with a set of user selected or use identified documents. For purposes of forming a user profile, the identified documents from which information is derived for inclusion in the user profile may include: documents identified by search results from the search engine, documents accessed (e.g., viewed or downloaded, for example using a browser application) by the user (including documents not identified in prior search results), documents linked to the documents identified by search results from the search engine, and documents linked to the documents accessed by the user, or any subset of such documents.

The general information 207 about the identified documents is also useful information about the user's preferences and interests. General information includes information such as the document format of accessed documents (e.g., HTML, plain text, portable document format (PDF), Microsoft Word), date information, creator information, and other metadata.

Activity information 209 describes the user's activities with respect to user selected documents (sometimes herein called the identified documents). This information describes factors such as how long the user spent viewing the document, the amount of scrolling activity on the document, and whether the user has printed, saved or bookmarked the document, and thus also suggests the importance of the document to the user as well as the user's preferences. In some embodiments, information about user activities 209 is used when weighting the importance of information extracted or derived from the user identified documents. In some embodiments, information about user activities 209 is used to determine which of the user identified documents to use as the basis for deriving the user profile. For example, information 209 may be used to select only documents that received significant user activity (in accordance with predefined criteria) for generating the user profile, or information 209 may be used to exclude from the profiling process documents that the user viewed for less than a predefined threshold amount of time.

The content of identified documents from previous search activities is a rich source of information about a user's interests and preferences. Key terms appearing in the identified documents and their frequencies with which they appear in the identified documents are not only useful for indexing the document, but are also a strong indication of the user's personal interests, especially when they are reinforce other types of user information discussed above. In one embodiment, instead of the whole documents, sampled content 211 from the identified documents is extracted for the purpose of user profile construction, to save storage space and computational cost. In another embodiment, various information related to the identified documents may be classified to constitute category information 213 about the identified documents. More discussion about content sampling, the process of identifying key terms in an identified document and the usage of the category information is provided below.

Optionally, a user may choose to offer personal information 215, including demographic and geographic information associated with the user, such as the user's age or age range, educational level or range, income level or range, language preferences, marital status, geographic location (e.g., the city, state and country in which the user resides, and possibly also including additional information such as street address, zip code, and telephone area code), cultural background or preferences, or any subset of these. The personal information 215 may also indicate whether the user is a member of in one or more defined groups (e.g., organizations, companies, associations, clubs, committees, and the like). The personal information 215 may also include psychographic information (e.g., personality trait information, or other personality descriptive information) either derived from other aspects of the user profile, or expressly provided by the user.

Compared with other types of personal information such as a user's favorite sports or movies that are often time varying, this personal information is more static and more difficult to infer from the user's search queries and search results, but maybe crucial in correctly interpreting certain queries submitted by the user. For example, if a user submits a query containing "Japanese restaurant", it is very likely that he may be searching for a local Japanese restaurant for dinner. Without knowing the user's geographical location, it is hard to order the search results so as to bring to the top those items that are most relevant to the user's true intention. In certain cases, however, it is possible to infer this information. For example, users often select results associated with a specific region corresponding to where they live.

Another potential source of information are expressed topics or category preferences 217. The user profile can include a list of terms or topics that the user expressly indicates as being among the user's interests. The terms can be selected by the user from a predefined list or hierarchy of topics and terms, or provided by the entirely by the user. Each term or topic can be associated with a weight indicating a degree of importance to the user.

Another potential source of information for the user profile is information 219 derived from web pages and web sites associated with the user. First, a given user often accesses the system 100 from a relatively limited number of IP addresses and domains. The system 100 can automatically identify and access one or more websites associated with these IP addresses and extract information from them, such as their type (commercial, educational, organization, government, etc.), their geographic location, their size, and so forth. The system can further perform analyses of one or more of the pages on these sites (such as the home page), to extract relevant topics, key words, or other descriptive information.

Creating a user profile 230 from the various sources of user information is a multi-step process, which be divided into sub-processes. Each sub-process produces one type of user profile characterizing a user's interests or preferences from a particular perspective. They are:

a term-based profile 231—this profile represents a user's search preferences with a plurality of terms, where each term is given a weight indicating the importance of the term to the user;

a category-based profile 233—this profile correlates a user's search preferences with a set of categories, which may be organized in a hierarchal fashion, with each category being given a weight indicating the extent of correlation between the user's search preferences and the category; and a link-based profile 235—this profile identifies a plurality of links that are directly or indirectly related to the user's search preferences, with each link being given a weight indicating the relevance between the user's search preferences and the link.

In some embodiments, the user profile 230 includes only a subset of these profiles 231, 233, 235, for example just one or two of these profiles. In one embodiment, the user profile 230 includes a term-based profile 231 and a category-based profile 233, but not a link-based profile 235.

In one embodiment, a user profile is created and stored in a database (e.g., user profile database 110) associated with a search engine. The advantage of such deployment is that the user profile can be easily accessed by multiple computers, and that since the profile is stored on a server associated with (or part of the search engine 104, it can be easily used by the search engine 104 to personalize the search results. In another embodiment, the user profile can be created and stored on the user's client 118. Creating and storing a user profile on the client not only reduces the computational and storage cost for the search engine's servers, but also satisfies some users' privacy requirements. In yet another embodiment, the user profile may be created and updated on the client 118, but stored in the user profile database 110. Such embodiment combines some of the benefits illustrated in the other two embodiments. It is understood by a person of ordinary skill in the art that the user profiles of the present invention can be implemented using client computers, server computers, or both.

Figure 3:
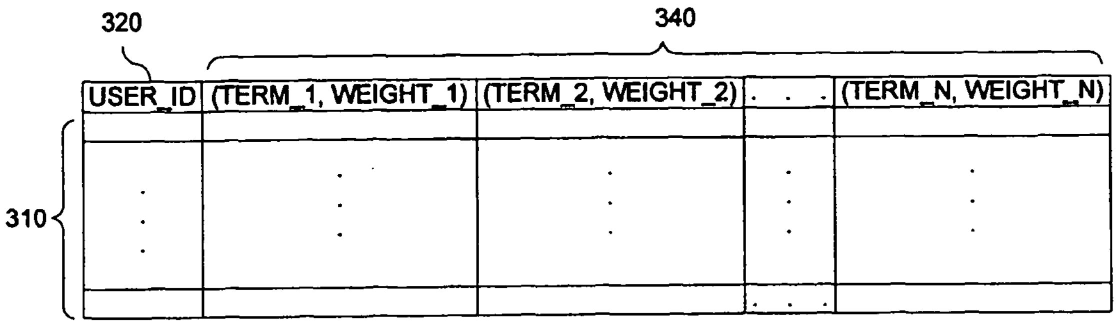
FIG. 3 is an exemplary data structure that may be used for storing term-based profiles for a plurality of users.

FIG. 3 illustrates an exemplary data structure, a term-based profile table 300, that may be used for storing term-based profiles for a plurality of users. Table 300 includes a plurality of records 310, each record corresponding to a user's term-based profile. A term-based profile record 310 includes a plurality of columns including a USER_ID column 320 and multiple columns of (TERM, WEIGHT) pairs 340. The USER_ID column stores a value that uniquely identifies a user, which may be the USER_ID itself, or a hash thereof. For a given user, there is a set of (TERM, WEIGHT) pairs, where each (TERM, WEIGHT) pair 340 includes a term, typically 1-3 words long, that is usually important to the user, and a weight associated with the term that quantifies the importance of the term. In one embodiment, the term may be represented as one or more n-grams. An n-gram is defined as a sequence of n tokens, where the tokens may be words. For example, the phrase "search engine" is an n-gram of length 2, and the word "search" is an n-gram of length 1. A particular USER_ID may also be used to identify a group of users.

N-grams can be used to represent textual objects as vectors. This makes it possible to apply geometric, statistical and other mathematical techniques, which are well defined for vectors, but not for objects in general. In the present invention, n-grams can be used to define a similarity measure between two terms based on the application of a mathematical function to the vector representations of the terms.

The weight of a term is not necessarily a positive value. If a term has a negative weight, it may suggest that the user prefers that his search results should not include this term and the magnitude of the negative weight indicates the strength of the user's preference for avoiding this term in the search results. By way of example, for a user who breeds Australian Shepard dogs in San Francisco, Calif., the term-based profile may include terms like "Australian Shepard", "agility training" and "San Francisco" with positive weights. The terms like "German Shepard" or "Australia" may also be included in the profile. However, these terms are more likely to receive a negative weight since they are irrelevant and confusing with the authentic preference of this particular user.

A term-based profile itemizes a user's preference using specific terms, each term having certain weight. If a document contains a term that is in a user's term-based profile, the term's weight will be assigned to the document; however, if a document does not contain the term, it will not receive any weight associated with this term. Such a requirement of relevance between a document and a user profile sometimes may be less flexible when dealing with various scenarios in which a fuzzy relevance between a user's preference and a document exists. For example, if a user's term-based profile includes terms like "Mozilla" and "browser", a document containing no such terms, but other terms like "Galeon" or "Opera" will not receive any weight because they do not match any existing term in the profile, even though they are actually Internet browsers. To address the need for matching a user's interests without exact term matching, a user's profile may include a category-based profile.

Figure 4A:
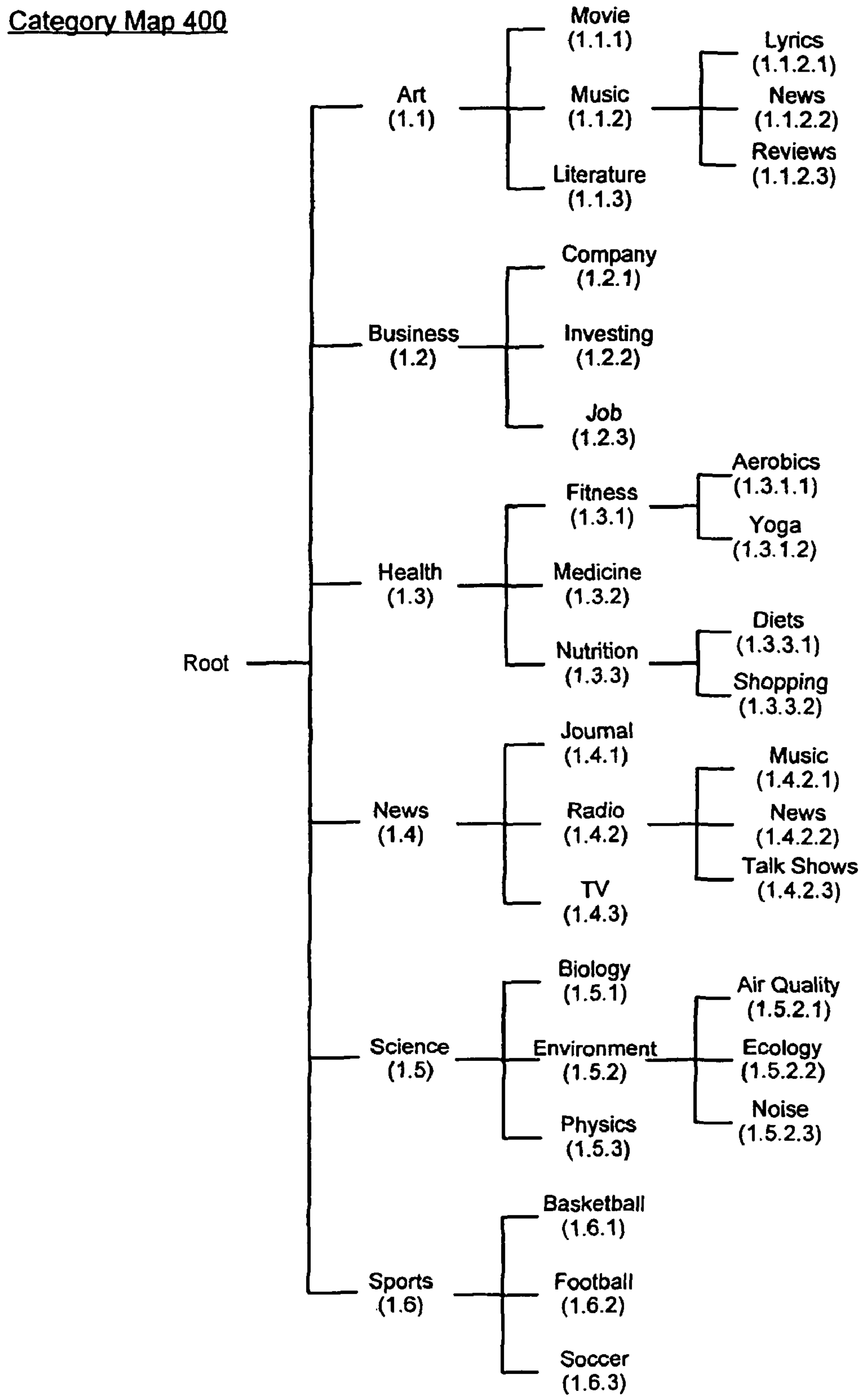
FIG. 4A is an exemplary category map that may be used for classifying a user's past search experience.

FIG. 4A illustrates a hierarchical category map 400 according to the Open Directory Project (http://dmoz.org/). Starting from the root level of map 400, documents are organized under several major topics, such as "Art", "News", "Sports", etc. These major topics are often too broad to delineate a user's specific interest. Therefore, they are further divided into sub-topics that are more specific. For example, topic "Art" may comprise sub-topics like "Movie", "Music" and "Literature" and the sub-topic "Music" may further comprise sub-sub-topics like "Lyrics", "News" and "Reviews". Note that each topic is associated with a unique CATEGORY_ID like 1.1 for "Art", 1.4.2.3 for "Talk Show" and 1.6.1 for "Basketball".

Figure 4B:
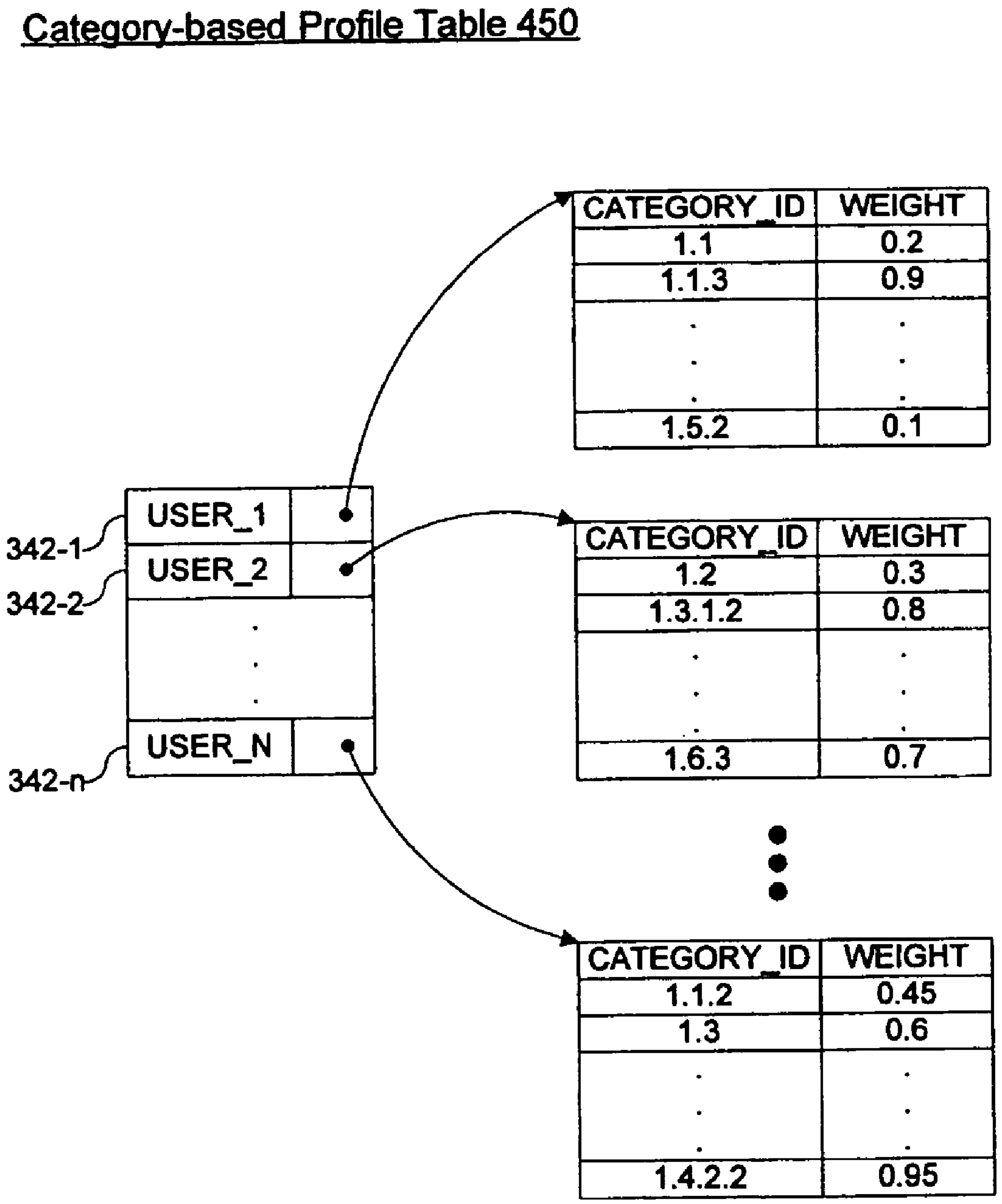
FIG. 4B is an exemplary data structure that may be used for storing category-based profiles for a plurality of users.

A user's specific interests may be associated with multiple categories at various levels, each of which may have a weight indicating the degree of relevance between the category and the user's interest. In one embodiment, a category-based profile may be implemented using a hash table data structure as shown in FIG. 4B. A category-based profile table 450 includes a table 455 that comprises a plurality of records 460, each record including a USER_ID and a pointer pointing to another data structure, such as table 460-1. Table 460-1 may include two columns, CATEGORY_ID column 470 and WEIGHT column 480. CATEGORY_ID column 470 contains a category's identification number as shown in FIG. 4A, suggesting that this category is relevant to the user's interests and the value in the WEIGHT column 480 indicates the degree of relevance of the category to the user's interests.

A user profile based upon the category map 400 is a topic-oriented implementation. The items in a category-based profile can also be organized in other ways. In one embodiment, a user's preference can be categorized based on the formats of the documents identified by the user, such as HTML, plain text, PDF, Microsoft Word, etc. Different formats may have different weights. In another embodiment, a user's preference can be categorized according to the types of the identified documents, e.g., an organization's homepage, a person's homepage, a research paper, or a news group posting, each type having an associated weight. Another type category that can be used to characterize a user's search preferences is document origin, for instance the country associated with each document's host. These types of category information can be derived from either the user's prior searches 203; or from the user's web related information 217. In yet another embodiment, the above-identified category-based profiles may co-exist, with each one reflecting one aspect of a user's preferences. Various methods for constructing user profiles from categories and terms is described in Ranking Nodes Application, referenced above.

Besides term-based and category-based profiles, another type of user profile is referred to as a link-based profile. As discussed above, the page rank algorithm disclosed in U.S. Pat. No. 6,285,999 uses the link structure that connects various documents over the Internet. A document that has more links pointing to it is often assigned a higher page rank and therefore attracts more attention from a search engine. Link information related to a document identified by a user can also be used to infer the user's preferences. In one embodiment, a list of preferred URLs are identified for a user by analyzing the frequency of his access to those URLs. Each preferred URL may be further weighted according to the time spent by the user and the user's scrolling activity at the URL, and/or other user activities 209 when visiting the document at the URL. In another embodiment, a list of preferred hosts are identified for a user by analyzing the user's frequency of accessing web pages of different hosts. When two preferred URLs are related to the same host the weights of the two URLs may be combined to determine a weight for the host. In another embodiment, a list of preferred domains are identified for a user by analyzing the user's frequency of accessing web pages of different domains. For example, for finance.yahoo-.com, the host is "finance.yahoo.com" while the domain is "yahoo.com".

Figure 5:
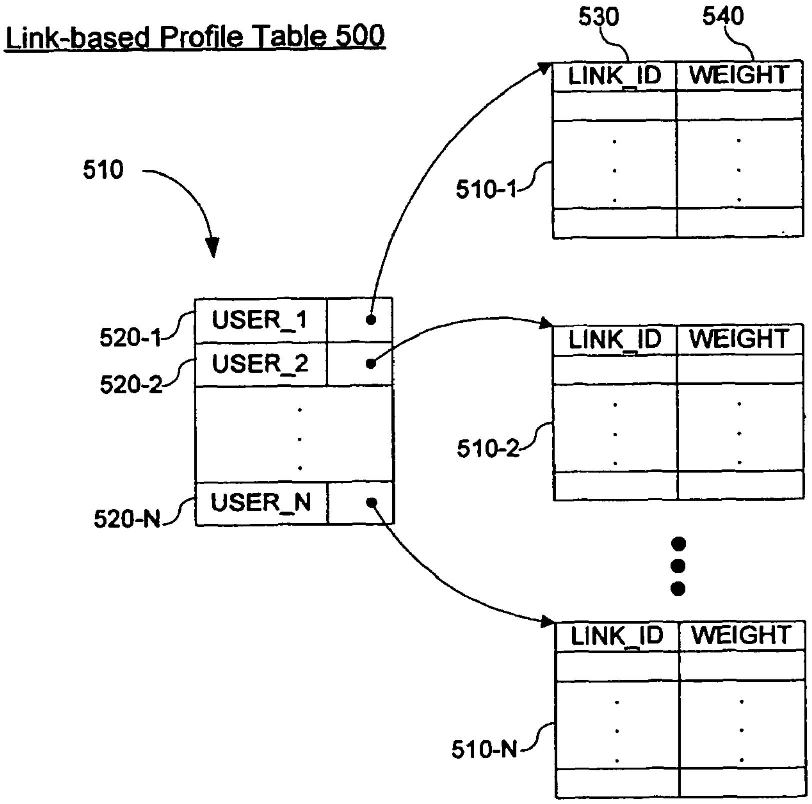
FIG. 5 is an exemplary data structure that may be used for storing link-based profiles for a plurality of users.

FIG. 5 illustrates a link-based profile using a hash table data structure. A link-based profile table 500 includes a table 510 that includes a plurality of records 520, each record including a USER_ID and a pointer pointing to another data structure, such as table 510-1. Table 510-1 may include two columns, LINK_ID column 530 and WEIGHT column 540. The identification number stored in the LINK_ID column 530 may be associated with a preferred URL or host. The actual URL/host/domain may be stored in the table instead of the LINK_ID, however it is preferable to store the LINK_ID to save storage space.

A preferred list of URLs and/or hosts includes URLs and/or hosts that have been directly identified by the user. The preferred list of URLs and/or host may furthermore extend to URLs and/or hosts indirectly identified by using methods such as collaborative filtering or bibliometric analysis, which are known to persons of ordinary skill in the art. In one embodiment, the indirectly identified URLs and/or host include URLs or hosts that have links to/from the directly identified URLs and/or hosts. These indirectly identified URLs and/or hosts are weighted by the distance between them and the associated URLs or hosts that are directly identified by the user. For example, when a directly identified URL or host has a weight of 1, URLs or hosts that are one link away may have a weight of 0.5, URLs or hosts that are two links away may have a weight of 0.25, etc. This procedure can be further refined by reducing the weight of links that are not related to the topic of the original URL or host, e.g., links to copyright pages or web browser software that can be used to view the documents associated with the user selected URL or host. Irrelevant Links can be identified based on their context or their distribution. For example, copyright links often use specific terms (e.g., copyright or "All rights reserved" are commonly used terms in the anchor text of a copyright link); and links to a website from many unrelated websites may suggest that this website is not topically related (e.g., links to the Internet Explorer website are often included in unrelated websites). The indirect links can also be classified according to a set of topics and links with very different topics may be excluded or be assigned a low weight.

The three types of user profiles discussed above are generally complimentary to one another since different profiles delineate a user's interests and preferences from different vantage points. However, this does not mean that one type of user profile, e.g., category-based profile, is incapable of playing a role that is typically played by another type of user profile. By way of example, a preferred URL or host in a link-based profile is often associated with a specific topic, e.g., finance.yahoo.com is a URL focusing on financial news. Therefore, what is achieved by a link-based profile that comprises a list of preferred URLs or hosts to characterize a user's preference may also be achievable, at least in part, by a category-based profile that has a set of categories that cover the same topics covered by preferred URLs or hosts.

The generation of a term-based profile 231 is generally as follows. Given a document identified (e.g., viewed) by a user, different terms in the document may have different importance in revealing the topic of the document. Some terms, e.g., the document's title, may be extremely important, while other terms may have little importance. For example, many documents contain navigational links, copyright statements, disclaimers and other text that may not be related to the topic of the document. How to efficiently select appropriate documents, content from those documents and terms from within the content is a challenging topic in computational linguistics. Additionally, it is preferred to minimize the volume of user information processed, so as make the process of user profile construction computationally efficient. Skipping less important terms in a document helps in accurately matching a document with a user's interest.

Paragraph sampling (described below with reference to FIG. 6) is a procedure for automatically extracting content from a document that may be relevant to a user. The paragraph sampling process takes advantage of the insight that less relevant content in a document, such as navigational links, copyright statements, disclaimer, etc., tends to form relatively short segments of text. In one embodiment, paragraph sampling looks for the paragraphs of greatest length in a document, processing the paragraphs in order of decreasing length until the length of a paragraph is below a predefined threshold. The paragraph sampling procedure optionally selects up to a certain maximum amount of content from each processed paragraph. If few paragraphs of suitable length are found in a document, the procedure falls back to extracting text from other parts of the document, such as anchor text and ALT tags.

Figure 6:
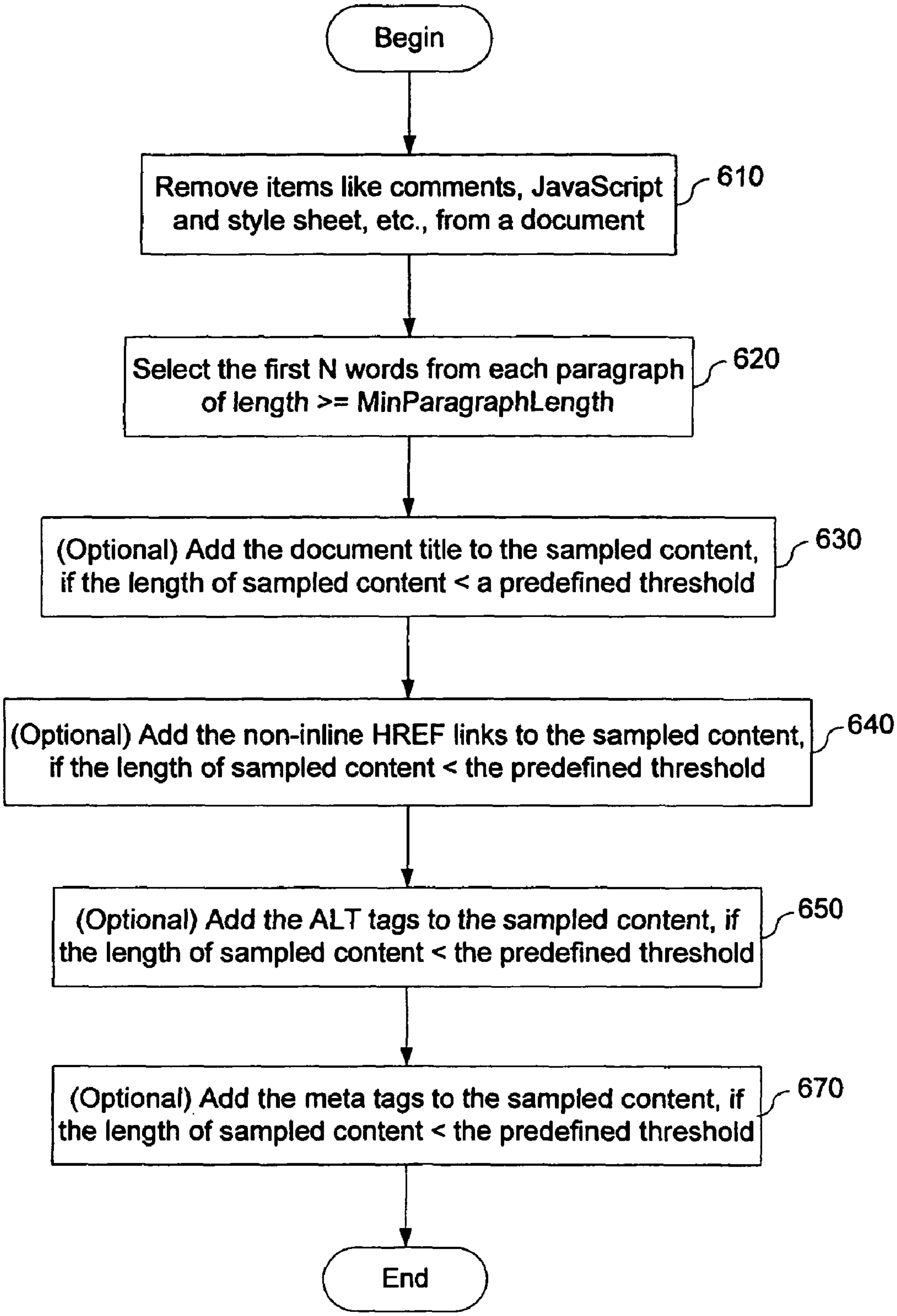
FIG. 6 is a flowchart illustrating paragraph sampling.

FIG. 6 is a flowchart illustrating the major steps of paragraph sampling. The process assumes that the document is initially loaded into memory. Paragraph sampling includes removing 610 (or simply ignoring) certain predefined items, such as comments, JavaScript and style sheets, etc., from a document. These items are removed because they are usually related to visual aspects of the document when rendered on a browser and are unlikely to be relevant to the document's topic. Following that, the procedure selects 620 the first N words (or M sentences) from each paragraph whose length is greater than a threshold value, MinParagraphLength, as sampled content. In one embodiment, the values of N and M are chosen to be 100 and 5, respectively. Other values may be used in other embodiments.

In order to reduce the computational and storage load associated with the paragraph sampling procedure, the procedure may impose a maximum limit, e.g., 1000 words, on the sampled content from each document. In one embodiment, the paragraph sampling procedure organizes all the paragraphs in a document in length decreasing order, and then starts the sampling process with a paragraph of maximum length. It is noted that the beginning and end of a paragraph depend on the appearance of the paragraph in a browser, not on the presence of uninterrupted a text string in the HTML representation of the paragraph. For this reason, certain HTML commands, such as commands for inline links and for bold text, are ignored when determining paragraph boundaries. In some embodiments, the paragraph sampling procedure screens the first N words (or M sentences) so as to filter out those sentences including boilerplate terms like "Terms of Service" or "Best viewed", because such sentences are usually deemed irrelevant to the document's topic.

Before sampling a next paragraph whose length is above the threshold value, the procedure may check to determine if the number of words in the sampled content has reached a maximum word limit. If so, the process can stop sampling content from the document. If the maximum word limit has not been reached after processing all paragraphs of length greater than the threshold, optional steps 630, 640, 650 and 670 are performed. In particular, the procedure adds the document title (630), the non-inline HREF links (640), the ALT tags (650) and the meta tags (670) to the sampled content until it reaches the maximum word limit.

Once a document has been sampled, the sampled content can be used for identifying a list of most important (or unimportant) terms through context analysis. Context analysis attempts to learn context terms that predict the most important (or unimportant) terms in a set of identified documents. Specifically, it looks for prefix patterns, postfix patterns, and a combination of both. For example, an expression "x's home page" may identify the term "x" as an important term for a user and therefore the postfix pattern "* home page" can be used to predict the location of an important term in a document, where the asterisk "*" represents any term that fits this postfix pattern. In general, the patterns identified by context analysis usually consist of m terms before an important (or unimportant) term and n terms after the important (or unimportant) term, where both m and n are greater than or equal to 0 and at least one of them is greater than 0. Typically, m and n are less than 5, and when non-zero are preferably between 1 and 3. Depending on its appearance frequency, a pattern may have an associated weight that indicates how important (or unimportant) the term recognized bay the pattern is expected to be.

Figure 7A:
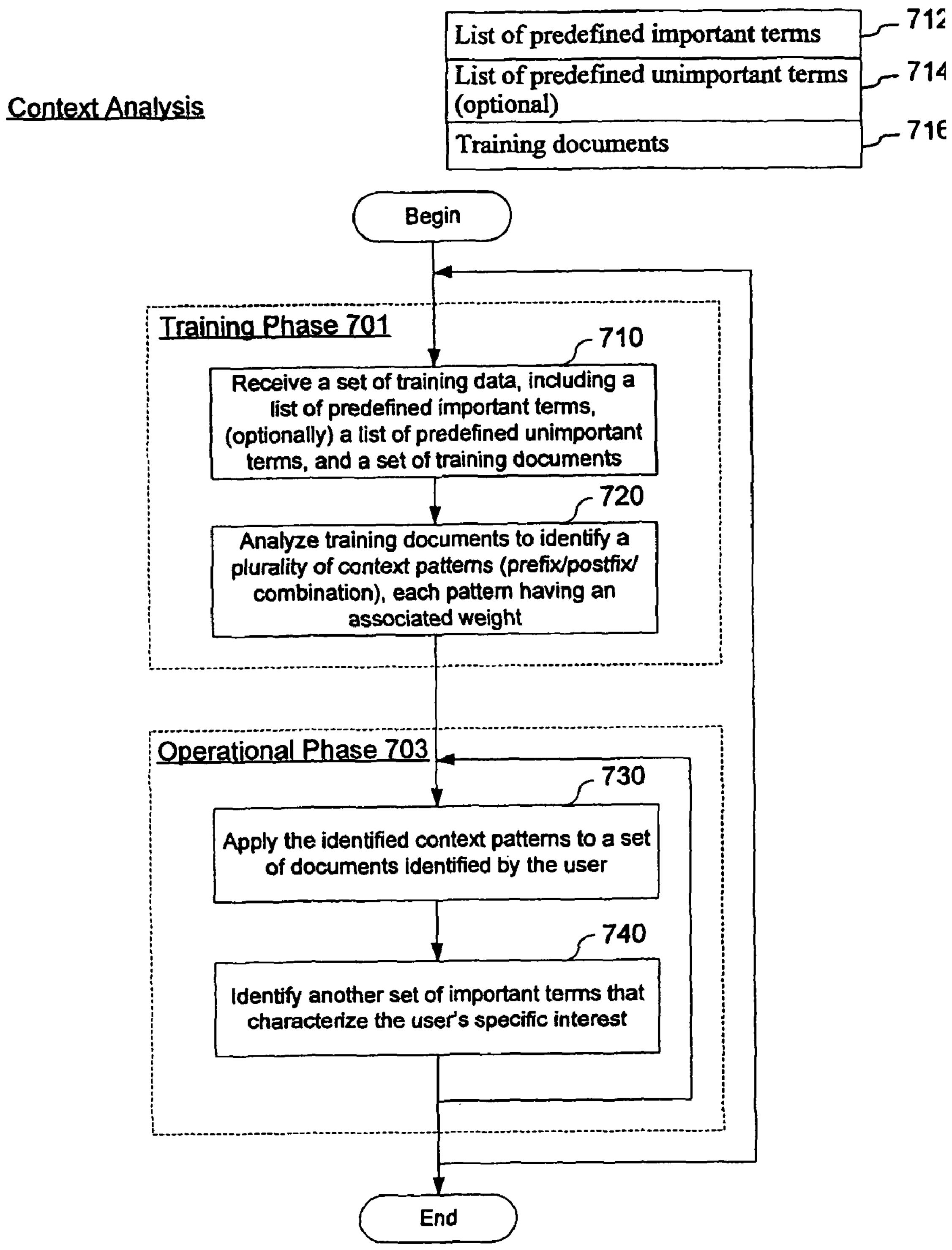
FIG. 7A is a flowchart illustrating context analysis.

FIG. 7A illustrates a flowchart for one embodiment of context analysis. This embodiment has two distinct phases, a training phase 701 and an operational phase 703. The training phase 701 receives 710 and utilizes a list of important terms 712, an optional list of unimportant terms 714, and a set of training documents. In some embodiments, the list of unimportant terms is not used. The source of the lists 712, 714 is not critical. In some embodiments, these lists 712, 714 are generated by extracting words or terms from a set of documents (e.g., a set of several thousand web pages of high page rank) in accordance with a set of rules, and then editing them to remove terms that in the opinion of the editor do not belong in the lists. The source of the training documents is also not critical. In some embodiments, the training documents comprise a randomly or pseudo-randomly selected set of documents already known to the search engine. In other embodiments, the training documents are selected from a database of documents in the search engine in accordance with predefined criteria.

During the training phase 701, the training documents are processed 720, using the lists of predefined important and unimportant terms, so as to identify a plurality of context patterns (e.g., prefix patterns, postfix patterns, and prefix-postfix patterns) and to associate a weight with each identified context pattern. During the operational phase 703, the context patterns are applied 730 to a document to identify 740 a set of important terms that characterize the user's specific interests and preferences. This process is repeated for any number of documents that are deemed to be associated with the user. Learning and delineating a user's interests and preferences is usually an ongoing process. Therefore, the operational phase 703 may be repeated to update the set of important terms that have been captured previously. This may be done each time a user accesses a document, according to a predetermined schedule, at times determined in accordance with specified criteria, or otherwise from time to time. Similarly, the training phase 701 may also be repeated to discover new sets of context patterns and to recalibrate the weights associated with the identified context patterns.

Below is a segment of pseudo code that exemplifies the training phase:

```
For each document in a set {
  For each important term in the document {
    For m = 0 to MaxPrefix {
      For n = 0 to MaxPostfix {
        Extract the m words before the important term and the n words
        after the important term as s;
        Add 1 to ImportantContext(m,n,s);
      }
    }
  }
  For each unimportant term in the document {
    For m = 0 to MaxPrefix {
      For n = 0 to MaxPostfix {
        Extract the m words before the unimportant term and the n
        words after the unimportant term as s;
        Add 1 to UnimportantContext(m,n,s);
      }
    }
  }
}
  For m = 0 to MaxPrefix {
    For n = 0 to MaxPostfix {
      For each value of s {
        Set the weight for s to a function of ImportantContext(m,n,s),
        and UnimportantContext(m,n,s);
      }
    }
  }
```

In the pseudo code above, the expression s refers to a prefix pattern (n=0), a postfix pattern (m=0) or a combination of both (m>0 & n>0). Each occurrence of a specific pattern is registered at one of the two multi-dimensional arrays, ImportantContext(m,n,s) or UnimportantContext(m,n,s). The weight of a prefix, postfix or combination pattern is set higher if this pattern identifies more important terms and fewer unimportant terms and vice versa. Note that it is possible that a same pattern may be associated with both important and unimportant terms. For example, the postfix expression "* operating system" may be used in the training documents 716 in conjunction with terms in the list of predefined important terms 712 and also used in conjunction with terms in the list of predefined unimportant terms 714. In this situation, the weight associated with the postfix pattern "* operating system" (represented by the expression Weight(1,0, "operating system")) will take into account the number of times the postfix expression is used in conjunction with terms in the list of predefined important terms as well as the number of times the postfix expression is used in conjunction with terms in the list of predefined unimportant terms. One possible formula to determine the weight of a context patterns is:

$$\text{Weight}(m,n,s)=\text{Log}(\text{ImportantContext}(m,n,s)+1)-\text{Log}(\text{UnimportantContext}(m,n,s)+1).$$

Other weight determination formulas may be used in other embodiments.

Figure 7B:
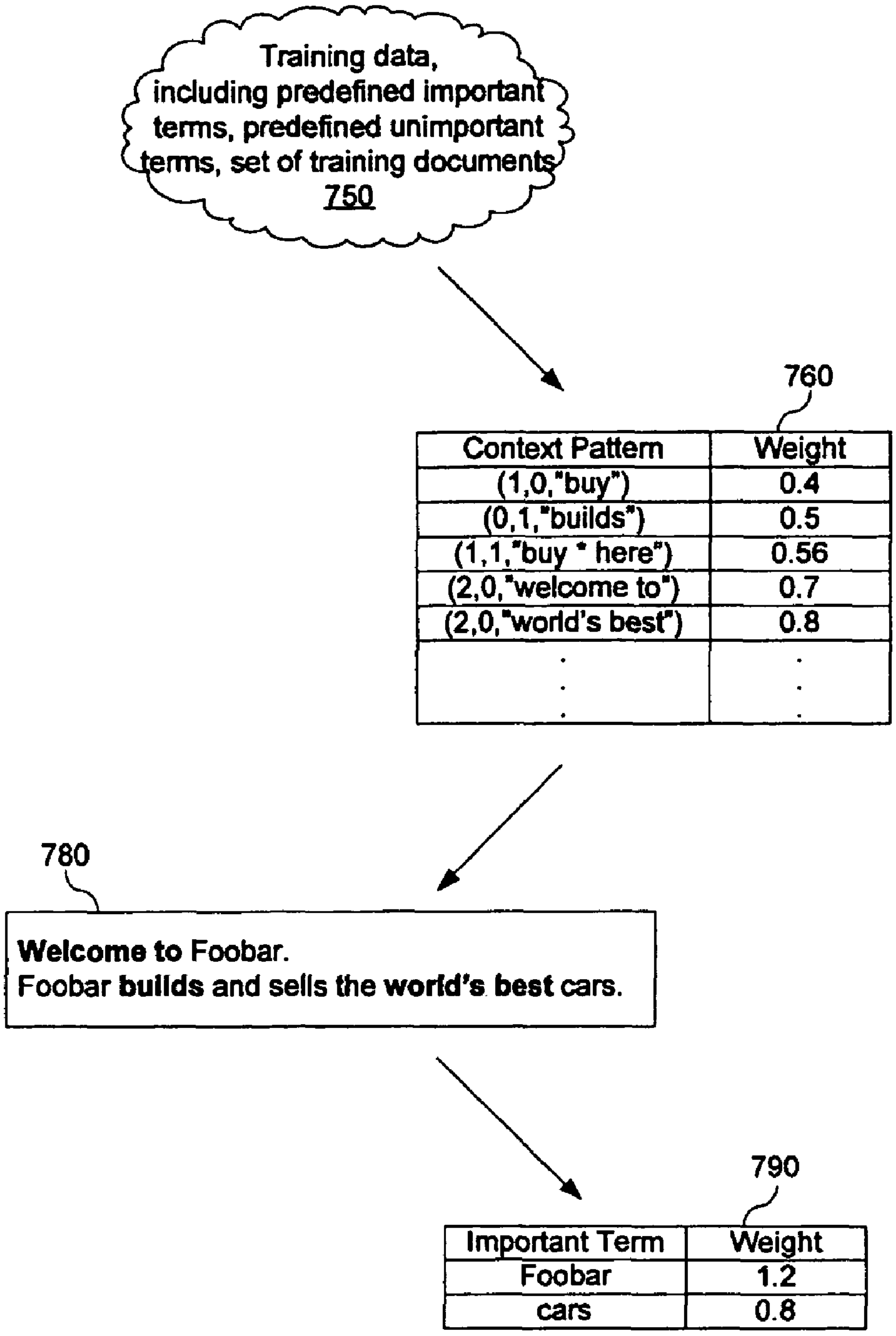
FIG. 7B depicts a process of identifying important terms using context analysis.

In the second, operational phase 703 of the context analysis process, the weighted context patterns are used to identify important terms in one or more documents identified by the user. Referring to FIG. 7B, in the first phase the user profile server 108 receives training data 750 and creates a set of context patterns 760, each context pattern having an associated weight. The user profile server 108 then applies the set of context patterns 760 to a document 780. In FIG. 7B, previously identified context patterns found within the document 780 are identified. Terms 790 associated with the context patterns are identified and each such term receives a weight based on the weights associated with the context patterns. For example, the term "Foobar" appears in the document twice, in association with two different patterns, the prefix pattern "Welcome to *" and the postfix pattern "* builds", and the weight 1.2 assigned to "Foobar" is the sum of the two patterns' weights, 0.7 and 0.5. The other identified term "cars" has a weight of 0.8 because the matching prefix pattern "world's best *" has a weight of 0.8. In some embodiments the weight for each term is computed using a log transform, where the final weight is equal to log(initial weight+1). It is possible that the two terms "Foobar" and "cars" may not be in the training data 750 and may have never been encountered by the user before. Nevertheless, the context analysis method described above identifies these terms and adds them to the user's term-based profile. Thus, context analysis can be used to discover terms associated with a particular documents, where the documents are those associated with the user, and thus the user's interests and preferences.

As noted, the output of context analysis can be used directly in constructing a user's term-based profile. Additionally, it may be useful in building other types of user profiles, such as a user's category-based profile. For example, a set of weighted terms can be analyzed and classified into a plurality of categories covering different topics, and those categories can be added to a user's category-based profile.

After executing the context analysis on a set of documents identified by or for a user, the resulting set of terms and weights may occupy a larger amount of storage than allocated for each user's term-based profile. Also, the set of terms and corresponding weights may include some terms with weights much, much smaller than other terms within the set. Therefore, in some embodiments, at the conclusion of the context analysis, the set of terms and weights is pruned by removing terms having the lowest weights (A) so that the total amount of storage occupied by the term-based profile meets predefined limits, and/or (B) so as to remove terms whose weights are so low, or terms that correspond to older items, as defined by predefined criteria, that the terms are deemed to be not indicative of the user's search preferences and interests. In some embodiments, similar pruning criteria and techniques are also applied to the category-based profile and/or the link-based profile.

In some embodiments, a user's profile is updated in the above manner each time the user performs a search and selects at least one document from the search results to download or view. In some embodiments, the user profile server 108 builds a list of documents identified by the user (e.g., by selecting the documents from search results) over time, and at predefined times (e.g., when the list reaches a predefined length, or a predefined amount of time has elapsed), performs a profile update of the user profile. When performing an update, new profile data is generated, and the new profile data is merged with the previously generated profile data for the user. In some embodiments, the new profile data is assigned higher importance than the previously generated profile data, thereby enabling the system to quickly adjust a user's profile in accordance with changes in the user's search preferences and interests. For example, the weights of items in the previously generated profile data may be automatically scaled downward prior to merging with the new profile data. In one embodiment, there is a date associated with each item in the profile, and the information in the profile is weighted based on its age, with older items receiving a lower weight than when they were new. In other embodiments, the new profile data is not assigned high importance than the previously generated profile data.

The paragraph sampling and context analysis methods may be used independently or in combination. When used in combination, the output of the paragraph sampling is used as input to the context analysis method. When used alone, the context analysis method can take the entire text of a document as its input, rather than just a sample.

In one embodiment, the content analysis module 112 also uses the methods described in association with FIGS. 6, 7A, and 7B for the creation of term-based profiles for creating the page profile of a page based on the content of the page. Thus, given a page (or a selection of pages from a website 119) the content analysis module 112 performs paragraph sampling on the page according to the method of FIG. 6, and then performs context analysis on the sampled content according to the methods of FIGS. 7A and 7B. The resulting terms that are extracted from this analysis are then stored as the page profile in the page profile database 121. In an alternative embodiment, the content analysis module 112 creates the page profile using the content analysis methods described in the Clusters of Related Words Application, incorporated by reference above.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead be performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "calculating" or "determining" or "identifying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

We claim:

1. A computer implemented method comprising:

obtaining with a search engine a set of search results in response to a search query from a first user, wherein the first user has an associated first user profile, and the first user profile includes an aggregate performance statistic and data describing a plurality of first attributes, wherein the aggregate performance statistic is aggregated from information for two or more users that have user profiles including one of more of the first attributes;

obtaining, for each of a plurality of advertisers, an initial price derived from the first attributes of the first user profile, wherein the initial price for an advertiser indicates how much the advertiser will pay for placement of one or more advertisements with search results provided in response to a query from a user associated with one or more attributes matching one or more of the plurality of first attributes;

adjusting the initial price for each advertiser according to the aggregate performance statistic in the first user profile;

selecting an advertiser from the plurality of advertisers, wherein the selected advertiser is the advertiser having a highest adjusted price, the highest adjusted price being higher than any other adjusted price for the plurality of advertisers;

selecting an advertisement of the selected advertiser; and providing the set of search results in conjunction with the selected advertisement;

wherein the obtaining the set of search results, obtaining the initial prices, adjusting the initial prices, selecting the advertiser, selecting the advertisement, and providing is performed by one or more computers.

2. The method of claim 1, wherein selecting the advertisement comprises selecting the advertisement in response to the search query.

3. The method of claim 1, wherein obtaining an initial price for an advertiser comprises:

providing the user profile to an advertisement database and retrieving the initial price from the advertisement database.

4. The method of claim 1, wherein obtaining an initial price for an advertiser comprises:

evaluating a price function associated with the advertiser, where the advertiser's price function receives the user profile as input.

5. The method of claim 4, wherein evaluating a price function associated with the advertiser comprises:

transmitting the user profile to a price server of the advertiser; and receiving the initial price for the user profile from the price server.

6. The method of claim 4, wherein evaluating a price function associated with the advertiser comprises:

transmitting the user profile and the search query to a price server of the advertiser; and receiving the initial price for the user profile and the search query from the price server.

7. The method of claim 1, wherein obtaining an initial price for an advertiser comprises:

determining whether the initial price is available in a local advertisement database, and if the initial price is available, providing the user profile to the local advertisement database and receiving the initial price from the local advertisement database; and if the initial price is not available in the local advertisement database, transmitting the user profile to a price server of the advertiser, and receiving the initial price from the price server.

8. The method of claim 1, wherein selecting an advertiser comprises evaluating the adjusted price for each of the plurality of advertisers.

9. A computer implemented method comprising:

obtaining with a search engine a set of search results in response to a search query from a first user, wherein the first user has an associated first user profile, and the first user profile includes data describing an aggregate performance statistic and a plurality of first attributes, wherein the aggregate performance statistic is aggregated information for two or more users that have user profiles including one of more of the first attributes;

obtaining, for each of a plurality of advertisers, an initial price derived from the first attributes of the first user profile, wherein the initial price for an advertiser indicates how much the advertiser will pay for placement of one or more advertisements associated with the advertiser with search results provided in response to the search query when the search query is received from a user associated with one or more attributes matching one or more of the plurality of first attributes;

adjusting the initial price for each advertiser according to the aggregate performance statistic in the first user profile;

selecting an advertiser from the plurality of advertisers, wherein the selected advertiser is the advertiser having a highest adjusted price, the highest adjusted price being higher than any other adjusted price for the plurality of advertisers;

selecting an advertisement of the selected advertiser; and providing the set of search results in conjunction with the selected advertisement;

wherein the obtaining the set of search results, obtaining the initial prices, adjusting the initial prices, selecting the advertiser, selecting the advertisement, and providing is performed by one or more computers.

10. A system comprising:

one or more computers; and a computer-readable medium coupled to the one or more computers having instructions stored thereon which, when executed by the one or more computers, cause the one or more computers to perform operations comprising:

obtaining with a search engine a set of search results in response to a search query from a first user, wherein the first user has an associated first user profile, and the first user profile includes data describing an aggregate performance statistic and a plurality of first attributes, wherein the aggregate performance statistic is aggregated from information for two or more users that have user profiles including one of more of the first attributes;

obtaining, for each of a plurality of advertisers, an initial price derived from the first attributes of the user profile, wherein the initial price for an advertiser indicates how much the advertiser will pay for placement of one or more advertisements with search results provided in response to a query from a user associated with one or more attributes matching one or more of the plurality of first attributes;

adjusting the initial price for each advertiser according to the aggregate performance statistic in the first user profile;

selecting an advertiser from the plurality of advertisers, wherein the selected advertiser is the advertiser having a highest adjusted price, the highest adjusted price being higher than any other adjusted price for the plurality of advertisers;

selecting an advertisement of the selected advertiser; and providing the set of search results in conjunction with the selected advertisement;

wherein the obtaining the set of search results, obtaining the initial prices, adjusting the initial prices, selecting the advertiser, selecting the advertisement, and providing is performed by one or more computers.

11. A system comprising:

one or more computers; and a computer-readable medium coupled to the one or more computers having instructions stored thereon which, when executed by the one or more computers, cause the one or more computers to perform operations comprising:

obtaining with a search engine a set of search results in response to receiving a search query from a first user, wherein the first user has an associated first user profile, and the first user profile includes data describing an aggregate performance statistic and a plurality of first attributes, wherein the aggregate performance statistic is aggregated from information for two or more users that have user profiles including one of more of the first attributes;

obtaining, for each of a plurality of advertisers, an initial price derived from the first attributes of the first user profile, wherein the initial price for an advertiser indicates how much the advertiser will pay for placement of one or more advertisements associated with the advertiser with search results provided in response to the query when the search query is received from a user associated with one or more attributes matching one or more of the plurality of first attributes;

adjusting the initial price for each advertiser according to the aggregate performance statistic in the first user profile;

selecting an advertiser from the plurality of advertisers, wherein the selected advertiser is the advertiser having a highest adjusted price, the highest adjusted price being higher than any other adjusted price for the plurality of advertisers;

selecting an advertisement of the selected advertiser; and providing the set of search results in conjunction with the selected advertisement;

wherein the obtaining the set of search results, receiving the initial prices, adjusting the initial prices, selecting the advertiser, selecting the advertisement, and providing is performed by one or more computers.

12. A computer implemented method comprising:

receiving a request for advertisements for placement on a third-party web page retrieved by a first user, wherein the first user has an associated first user profile, and the first user profile includes data describing an aggregate performance statistic and a plurality of first attributes, wherein the aggregate performance statistic is aggregated information for two or more users that have user profiles including one of more of the first attributes;

obtaining, for each of a plurality of advertisers, an initial price derived from the first attributes of the user profile, wherein the initial price for an advertiser indicates how much the advertiser will pay for placement of one or more advertisements associated with the advertiser on the third party web page, when the third party web page is presented to a user associated with one or more attributes matching one or more of the plurality of first attributes;

adjusting the initial price for each advertiser according to the aggregate performance statistic in the first user profile;

selecting an advertiser from the plurality of advertisers, wherein the selected advertiser is the advertiser having a highest adjusted price, the highest adjusted price being higher than any other adjusted price for the plurality of advertisers;

selecting an advertisement of the advertiser; and providing the advertisement for placement on the first third-party web page;

wherein the receiving the request, obtaining the initial prices, adjusting the initial prices, selecting the advertiser, selecting the advertisement, and providing is performed by one or more computers.

13. The method of claim 12, wherein the initial price is further derived from a page profile of the third-party web page.

14. The method of claim 13, wherein obtaining an initial price for an advertiser comprises receiving the price from determining an advertisement database, where the advertisement database receives the page profile and the first user profile, and provides the price.

15. The method of claim 13, wherein obtaining an initial price for an advertiser comprises evaluating a price function associated with the advertiser, where the advertiser's price function receives the page profile and the first user profile.

16. The method of claim 15, wherein evaluating a price function associated with the advertiser comprises:

transmitting the page profile and the first user profile to a price server of the advertiser; and receiving a price from the price server.

17. The method of claim 13, wherein obtaining an initial price for an advertiser comprises:

determining whether the initial price is available in a local advertisement database, and if the initial price is available, retrieving the initial price; and if the initial price is not available in the local advertisement database, transmitting the page profile and the first user profile to a price server of the advertiser, and receiving the initial price from the price server.

18. A system comprising:

one or more computers; and a computer-readable medium coupled to the one or more computers having instructions stored thereon which, when executed by the one or more computers, cause the one or more computers to perform operations comprising:

receiving a request for advertisements for placement on a third-party web page retrieved by a first user, wherein the first user has an associated first user profile, and the first user profile includes data describing an aggregate performance statistic and a plurality of first attributes, wherein the aggregate performance statistic is aggregated information for two or more users that have user profiles including one of more of the first attributes;

obtaining, for each of a plurality of advertisers, an initial price derived from the first attributes of the user profile, wherein the initial price for an advertiser indicates how much the advertiser will pay for placement of one or more advertisements associated with the advertiser on the third party web page, when the third party web page is presented to a user associated with one or more attributes matching one or more of the plurality of first attributes;

adjusting the initial price for each advertiser according to the aggregate performance statistic in the first user profile;

selecting an advertiser from the plurality of advertisers, wherein the selected advertiser is the advertiser having a highest adjusted price, the highest adjusted price being higher than any other adjusted price for the plurality of advertisers;

selecting an advertisement of the selected advertiser; and providing the selected advertisement for placement on the first third-party web page;

wherein the receiving the request, obtaining the initial prices, adjusting the initial prices, selecting the advertiser, selecting the advertisement, and providing is performed by one or more computers.

19. The method of claim 1, wherein the aggregated performance statistic is one of a click-through-rate, a click-through-count, a conversion rate, or a conversion count.

20. The method of claim 19, wherein the aggregate performance statistic is specific to advertisements associated with a particular interest.

21. The method of claim 1, further comprising time-weighting the aggregate performance statistic so that more recent information used to generate the statistic is more heavily weighted than older information used to generate the statistic.

22. The method of claim 13, wherein the initial price for an advertiser is derived from a contribution from the user profile and a contribution from the page profile, the method further comprising weighting the contribution of the user profile and weighting the contribution of the page profile.

* * * * *

UNITED STATES PATENT AND TRADEMARK OFFICE

CERTIFICATE OF CORRECTION

| | |
|---|---|
| PATENT NO. | : 8,321,278 B2 |
| APPLICATION NO. | : 10/877776 |
| DATED | : November 27, 2012 |
| INVENTOR(S) | : Taher H. Haveliwala et al. |

It is certified that error appears in the above-identified patent and that said Letters Patent is hereby corrected as shown below:

Column 1, Line 7 – after "to" delete "of".

Signed and Sealed this
Nineteenth Day of March, 2013

Teresa Stanek Rea
*Acting Director of the United States Patent and Trademark Office*

UNITED STATES PATENT AND TRADEMARK OFFICE

CERTIFICATE OF CORRECTION

PATENT NO. : 8,321,278 B2
APPLICATION NO. : 10/877776
DATED : November 27, 2012
INVENTOR(S) : Haveliwala et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1794 days.

Signed and Sealed this
Twenty-first Day of October, 2014

Michelle K. Lee

Michelle K. Lee
*Deputy Director of the United States Patent and Trademark Office*